US011967279B2

(12) United States Patent
Liu et al.

(10) Patent No.: US 11,967,279 B2
(45) Date of Patent: Apr. 23, 2024

(54) PIXEL DRIVING CIRCUIT, METHOD FOR DRIVING THE PIXEL DRIVING CIRCUIT, SILICON-BASED DISPLAY PANEL AND DISPLAY DEVICE

(71) Applicant: SEEYA OPTRONICS CO., LTD., Shanghai (CN)

(72) Inventors: Ping-lin Liu, Shanghai (CN); Tong Wu, Shanghai (CN)

(73) Assignee: SEEYA OPTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/865,657

(22) Filed: Jul. 15, 2022

(65) Prior Publication Data

US 2023/0066613 A1 Mar. 2, 2023

(30) Foreign Application Priority Data

Aug. 31, 2021 (CN) ......................... 202111014624.5

(51) Int. Cl.
*G09G 3/3233* (2016.01)
*G09G 3/3266* (2016.01)
(Continued)

(52) U.S. Cl.
CPC ......... *G09G 3/3233* (2013.01); *G09G 3/3266* (2013.01); *G09G 3/3291* (2013.01);
(Continued)

(58) Field of Classification Search
None
See application file for complete search history.

(56) References Cited

U.S. PATENT DOCUMENTS 10,964,264 B1 3/2021 Kim
10,991,302 B1 * 4/2021 Park .................... G09G 3/3291
(Continued)

FOREIGN PATENT DOCUMENTS

CN 104217682 2/2014
CN 104050917 9/2014
(Continued)

OTHER PUBLICATIONS

First Search Report dated Mar. 24, 2022 In Corresponding Chinese Patent Application No.
(Continued)

*Primary Examiner* — Lin Li
(74) *Attorney, Agent, or Firm* — DUANE MORRIS LLP

(57) ABSTRACT

Provided are a pixel driving circuit, a method for driving the pixel driving circuit, a silicon-based display panel and a display device. The pixel driving circuit is used for driving a light-emitting element to emit light. At an initial stage, a reset circuit provides a reset signal to a third node; a light emission control transistor is in a first on state to transmit the reset signal to a second node; a threshold compensation circuit transmits the reset signal to a first node; and a data write circuit transmits a non-enable level Vofs of a data signal to a second terminal of a first capacitor. At a threshold compensation stage, the threshold compensation circuit provides a threshold voltage of a drive transistor to the first node for compensation.

13 Claims, 14 Drawing Sheets

(51) Int. Cl.
*G09G 3/3291* (2016.01)
*H10K 59/121* (2023.01)

(52) U.S. Cl.
CPC ............... *G09G 2300/0852* (2013.01); *G09G 2310/061* (2013.01); *G09G 2320/0233* (2013.01)

(56) References Cited

U.S. PATENT DOCUMENTS

| | | | | |
|---|---|---|---|---|
| 2017/0075488 | A1* | 3/2017 | Lai | G06F 3/0446 |
| 2017/0162115 | A1* | 6/2017 | Chen | H10K 59/1213 |
| 2020/0184893 | A1* | 6/2020 | Dong | G09G 3/3233 |
| 2021/0110770 | A1* | 4/2021 | Yang | G09G 3/3258 |
| 2021/0112770 | A1* | 4/2021 | Horanoff | A01K 29/005 |
| 2021/0134213 | A1* | 5/2021 | Jang | G09G 3/3266 |
| 2022/0173189 | A1* | 6/2022 | Kim | H10K 59/1216 |
| 2022/0199022 | A1* | 6/2022 | Huangfu | G09G 3/3233 |
| 2022/0208099 | A1* | 6/2022 | Liu | G09G 3/3258 |

FOREIGN PATENT DOCUMENTS

| | | | | |
|---|---|---|---|---|
| CN | 105702214 | | 6/2016 | |
| CN | 108510946 | | 9/2018 | |
| CN | 108665852 | | 10/2018 | |
| CN | 112992075 | A * | 6/2021 | G09G 3/3258 |

OTHER PUBLICATIONS

First Office Action dated Apr. 2, 2022 In Corresponding Chinese Patent Application No.

* cited by examiner

PIXEL DRIVING CIRCUIT, METHOD FOR DRIVING THE PIXEL DRIVING CIRCUIT, SILICON-BASED DISPLAY PANEL AND DISPLAY DEVICE

CROSS-REFERENCE TO RELATED APPLICATION(S)

This application claims priority to Chinese Patent Application No. 202111014624.5 filed Aug. 31, 2021, the disclosure of which is incorporated herein by reference in its entirety.

TECHNICAL FIELD

The present disclosure relates to the field of silicon-based display technology and, in particular, to a pixel driving circuit, a method for driving the pixel driving circuit, a silicon-based display panel and a display device.

BACKGROUND

A light-emitting element in a silicon-based display panel is typically an organic light-emitting diode (OLED) element which has the advantages of self-luminescence, a low drive voltage, high luminescence efficiency, a short response time and the like so that the silicon-based display panel becomes the most promising display panel in current wearable devices such as wristwatches, bracelets and virtual reality (VR) glasses.

Since the OLED element is a current-driven element, a corresponding pixel driving circuit needs to be configured to provide a drive current for the OLED element so that the OLED element can emit light. The pixel driving circuit in the silicon-based display panel typically includes a drive transistor, a switch transistor and a storage capacitor. Where the drive transistor can generate the drive current for driving the OLED element according to the voltage of its gate. However, for reasons such as the process of techniques and the aging of devices, a threshold voltage drift occurs in the drive transistor in the pixel driving circuit, resulting in display non-uniformity.

SUMMARY

In view of the preceding problems, embodiments of the present disclosure provide a pixel driving circuit, a method for driving the pixel driving circuit, a silicon-based display panel and a display device, so as to eliminate an effect of a threshold drift on display brightness, solve the problem of an afterimage, and improve a display effect.

In a first aspect, the embodiments of the present disclosure provide a pixel driving circuit for driving a light-emitting element to emit light. The pixel driving circuit includes a drive transistor, a light emission control transistor, a first capacitor, a second capacitor, a reset circuit, a data write circuit, and a threshold compensation circuit.

A gate of the drive transistor, a first terminal of the first capacitor, a second terminal of the second capacitor, and the threshold compensation circuit are electrically connected to a first node. A first terminal of the second capacitor is configured to receive a fixed voltage signal. A first electrode of the light emission control transistor, a second electrode of the drive transistor, and the threshold compensation circuit are electrically connected to a second node. A second electrode of the light emission control transistor, the reset circuit, and an anode of the light-emitting element are electrically connected to a third node.

At an initial stage, the reset circuit is configured to provide a reset signal to the third node to reset the anode of the light-emitting element; the light emission control transistor is configured to be in a first on state under the control of a first light emission enable level to transmit the reset signal to the second node to reset the second electrode of the drive transistor; the threshold compensation circuit is configured to transmit the reset signal to the first node to reset the first capacitor, the second capacitor, and the gate of the drive transistor; and the data write circuit is configured to transmit a non-enable level Vofs of a data signal to a second terminal of the first capacitor.

At a threshold compensation stage, the threshold compensation circuit is configured to provide a threshold voltage of the drive transistor to the first node for compensation such that a potential of the first node is equal to VN1; and the data write circuit is configured to write the non-enable level Vofs of the data signal to the second terminal of the first capacitor.

At a data write stage, the data write circuit is configured to write an enable level Vdata of the data signal to the second terminal of the first capacitor such that the potential of the first node changes from VN1 to VN1', where $VN1'=VN1-(Vdata-Vofs)\times(c1/(c1+c2))$, where Vdata denotes the enable level of the data signal, Vofs denotes the non-enable level of the data signal, c1 denotes a capacitance value of the first capacitor, and c2 denotes a capacitance value of the second capacitor.

At a light emission stage, the light emission control transistor is configured to be in a second on state under the control of a second light emission enable level such that a drive current generated by the drive transistor according to the potential VN1' of the first node is transmitted to the light-emitting element to drive the light-emitting element to emit light.

A smaller current flows through the light emission control transistor in the first on state than the light emission control transistor in the second on state.

In a second aspect, the embodiments of the present disclosure further provide a method for driving a pixel driving circuit. The method is used for driving the preceding pixel driving circuit. The method for driving a pixel driving circuit includes steps described below.

At an initial stage, a reset circuit provides a reset signal to a third node to reset an anode of a light-emitting element; a light emission control transistor is in a first on state under the control of a first light emission enable level to transmit the reset signal to a second node to reset a second electrode of a drive transistor; a threshold compensation circuit transmits the reset signal to a first node to reset a first capacitor, a second capacitor, and a gate of the drive transistor; and a data write circuit transmits a non-enable level Vofs of a data signal to a second terminal of the first capacitor.

At a threshold compensation stage, the light emission control transistor is in an off state; the threshold compensation circuit provides a threshold voltage of the drive transistor to the first node for compensation such that a potential of the first node is equal to VN1; and the data write circuit continues writing the non-enable level Vofs of the data signal to the second terminal of the first capacitor.

At a data write stage, the light emission control transistor is in the off state; and the data write circuit writes an enable level Vdata of the data signal to the second terminal of the first capacitor such that the potential of the first node changes from VN1 to VN1'. Where $VN1'=VN1-(Vdata-Vofs)\times(c1/(c1+c2))$, where Vdata denotes the enable level of the data signal, Vofs denotes the non-enable level of the data signal, c1 denotes a capacitance value of the first capacitor, and c2 denotes a capacitance value of the second capacitor.

At a light emission stage, the light emission control transistor is in a second on state under the control of a second light emission enable level such that a drive current generated by the drive transistor according to the potential VN1' of the first node is transmitted to the light-emitting element to drive the light-emitting element to emit light.

A smaller current flows through the light emission control transistor in the first on state than the light emission control transistor in the second on state.

In a third aspect, the embodiments of the present disclosure further provide a silicon-based display panel. The silicon-based display panel includes a plurality of light-emitting elements and a plurality of pixel driving circuits described above. The plurality of pixel driving circuits are arranged in an array and configured to drive the plurality of light-emitting elements to emit light.

In a fourth aspect, the embodiments of the present disclosure further provide a display device including the preceding silicon-based display panel.

According to the pixel driving circuit, the method for driving the pixel driving circuit, the silicon-based display panel and the display device provided by the embodiments of the present disclosure, at the initial stage, the light emission control transistor is in the first on state under the control of the first light emission enable level so that a relatively small current flows through the light emission control transistor on the premise that the anode of the light-emitting element, the second electrode of the drive transistor, and the gate of the drive transistor can be reset in sequence. Therefore, the light emission control transistor has relatively small power consumption, facilitating the low power consumption of the pixel driving circuit. When the pixel driving circuit is applied to the display panel, the low power consumption of the silicon-based display panel can be facilitated and the application requirement of the silicon-based display panel for low power consumption can be satisfied. Moreover, at the light emission stage, the light emission control transistor is in the second on state under the control of the second light emission enable level so that a relatively large current can flow through the light emission control transistor, and the anode of the light-emitting element can be quickly charged by the drive current provided by the drive transistor, so as to prevent the silicon-based display panel including the pixel driving circuit from a color cast. Additionally, at the threshold compensation stage, the threshold voltage of the drive transistor is provided to the first node for compensation so that the drive current provided by the drive transistor at the light emission stage is independent of the threshold voltage of the drive transistor, so as to prevent a threshold drift of the drive transistor from affecting the display uniformity of the display panel and solve the problem of display non-uniformity of the display panel. Additionally, at the data write stage, the voltage of the first node N1 is divided by the first capacitor and the second capacitor so that even if the enable level of the data signal written by the data write circuit to the second terminal of the first capacitor is a relatively large voltage, a voltage coupled to the second terminal of the first capacitor is proportional to a ratio of the capacitance value of the first capacitor to a sum of the capacitance values of the two capacitors (the first capacitor and the second capacitor). Therefore, by setting the capacitance values of the first capacitor and the second capacitor, the enable level of the data signal changes within a relatively large range and the potential of the first node changes within a relatively small range so that the brightness of the light-emitting element has different levels and can be adjusted with higher accuracy, improving the color richness of the image displayed by the display panel and the display quality of the display panel.

DETAILED DESCRIPTION

Figure 1:
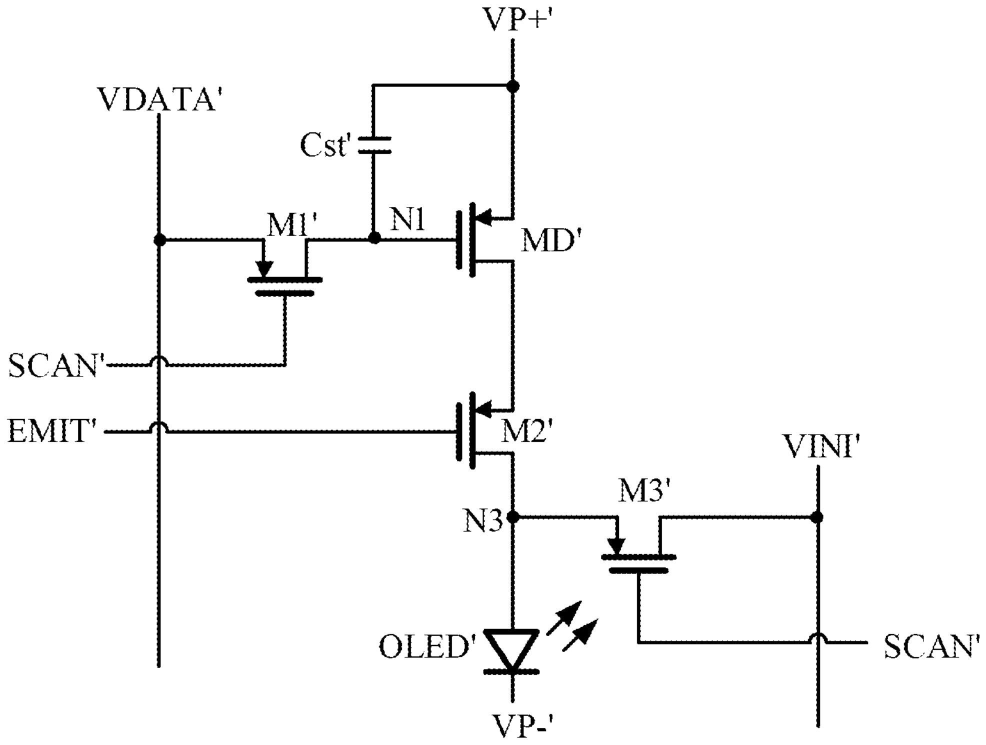
FIG. 1 is a structure diagram of a pixel driving circuit in the related art.

The present disclosure is further described hereinafter in detail in conjunction with drawings and embodiments. It is to be understood that the embodiments described herein are merely intended to explain the present disclosure and not to limit the present disclosure. Additionally, it is to be noted that for ease of description, only part, not all, of the structures related to the present disclosure are illustrated in the drawings.

Figure 2:
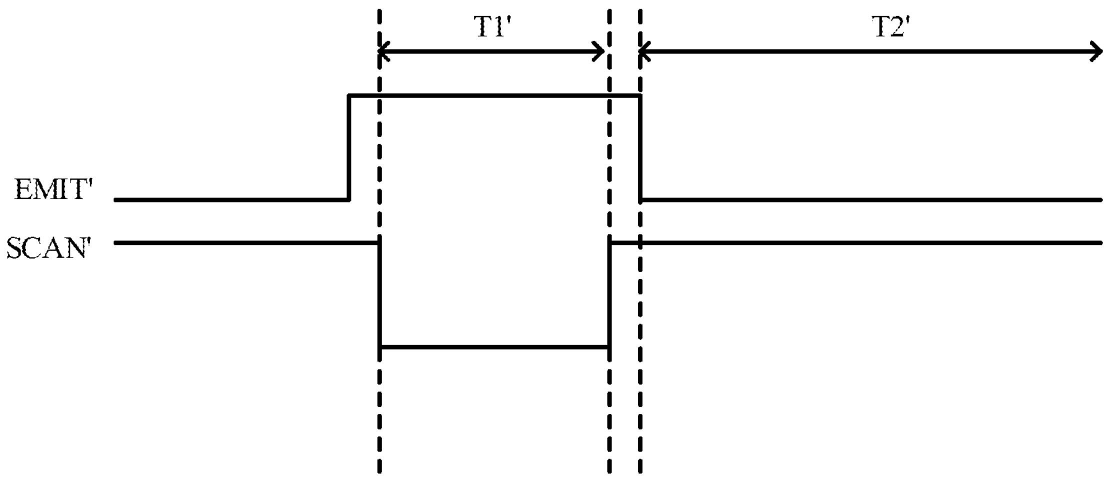
FIG. 2 is a drive timing diagram of a pixel circuit corresponding to FIG. 1.

FIG. 1 is a structure diagram of a pixel driving circuit in the related art. FIG. 2 is a drive timing diagram of a pixel circuit corresponding to FIG. 1. As shown in FIGS. 1 and 2, the pixel driving circuit includes a drive transistor MD', a data write transistor M1', a light emission control transistor M2', a reset transistor M3', and a storage capacitor Cst', where the data write transistor M1' and the reset transistor M3' are turned on or off under the control of a scan signal SCAN', and the light emission control transistor M2' is turned on or off under the control of a light emission control signal EMIT'. At an initial stage T1', the scan signal SCAN' controls both the data write transistor M1' and the reset transistor M3' to be in an on state such that a data signal VDATA' is written to a gate of the drive transistor MD' through the data write transistor M1' that is on and stored in the storage capacitor Cst'; and at the same time, a reset signal VINI' is transmitted to an anode of a light-emitting element OLED' through the reset transistor M3' that is on to reset the anode of the light-emitting element OLED'. At a light emission stage T2', a light emission control signal EMIT' controls the light emission control transistor M2' to be in the on state such that a current path is formed between a positive power supply VP+' and a negative power supply VP−', and a drive current provided by the drive transistor MD' according to a potential of the gate of the drive transistor MD' is transmitted to the light-emitting element OLED' to drive the light-emitting element OLED' to emit light.

The drive transistor MD' works within a subthreshold region so that the drive current $I_{MD}'$ provided by the drive transistor MD' at the light emission stage is expressed as follows:

$$I_{MD'} = \frac{Z}{L}\mu_p\left(\frac{kT}{q}\right)^2 C_D(\varphi_s)\exp\left[\frac{q}{kT}\left(\frac{V_{GS}-V_{th}}{n}\right)\right]*\left[1-\exp\left(-\frac{qV_{DS}}{kT}\right)\right];$$

where k denotes a Boltzmann constant, T denotes an absolute temperature, q denotes an amount of charge, L denotes a channel length of a metal-oxide-semiconductor (MOS) transistor, $\mu_p$ denotes a carrier mobility of a p-type MOS (PMOS) transistor, $C_D(\varphi_s)$ denotes a barrier capacitance of a channel depletion region, $V_{GS}$ denotes a voltage difference between the gate and a source of the drive transistor MD', that is, VDATA'−VP+', $V_{DS}$ denotes a voltage difference between a drain and the source of the drive transistor MD', and $V_{th}$ denotes a threshold voltage of the drive transistor MD'. The drive current Imp' is sensitive to and exponentially related to the threshold voltage $V_{th}$ of the drive transistor MD' so that when the threshold voltage $V_{th}$ of the drive transistor MD' in the pixel driving circuit changes, the drive current Imp' exponentially changes with a variation $\Delta V_{th}$ of the threshold voltage $V_{th}$, and finally the brightness of the light-emitting element is uncontrollable, resulting in display non-uniformity and affecting a display effect. Moreover, since the drive transistor MD' is typically the PMOS transistor which has a relatively large mobility, the drive current is typically at a pA to nA level so that the data signal VDATA' has a very small voltage range and it is difficult to switch within a range of 0 to 255 grayscales, affecting the display quality of a displayed image.

To solve the preceding technical problems, embodiments of the present disclosure provide a pixel driving circuit for driving a light-emitting element to emit light. The pixel driving circuit includes a drive transistor, a light emission control transistor, a first capacitor, a second capacitor, a reset circuit, a data write circuit, and a threshold compensation circuit. A gate of the drive transistor, a first terminal of the first capacitor, a second terminal of the second capacitor, and the threshold compensation circuit are electrically connected to a first node. A first terminal of the second capacitor is configured to receive a fixed voltage signal. A first electrode of the light emission control transistor, a second electrode of the drive transistor, and the threshold compensation circuit are electrically connected to a second node. A second electrode of the light emission control transistor, the reset circuit, and an anode of the light-emitting element are electrically connected to a third node. At an initial stage, the reset circuit is configured to provide a reset signal to the third node to reset the anode of the light-emitting element; the light emission control transistor is configured to be in a first on state under the control of a first light emission enable level to transmit the reset signal to the second node to reset the second electrode of the drive transistor; the threshold compensation circuit is configured to transmit the reset signal to the first node to reset the first capacitor, the second capacitor, and the gate of the drive transistor; and the data write circuit is configured to transmit a non-enable level of a data signal to a second terminal of the first capacitor. At a threshold compensation stage, the threshold compensation circuit is configured to provide a threshold voltage of the drive transistor to the first node for compensation such that a potential of the first node is equal to VN1; and the data write circuit is configured to continue writing the non-enable level of the data signal to the second terminal of the first capacitor. At a data write stage, the data write circuit is configured to write an enable level of the data signal to the second terminal of the first capacitor such that the potential of the first node changes from VN1 to VN1'. Where VN1'=VN1−(Vdata−Vofs)×(c1/(c1+c2)), Vdata denotes the enable level of the data signal, Vofs denotes the non-enable level of the data signal, c1 denotes a capacitance value of the first capacitor, and c2 denotes a capacitance value of the second capacitor. At a light emission stage, the light emission control transistor is configured to be in a second on state under the control of a second light emission enable level such that a drive current generated by the drive transistor according to the potential VN1' of the first node is transmitted to the light-emitting element to drive the light-emitting element to emit light. A smaller current flows through the light emission control transistor in the first on state than the light emission control transistor in the second on state.

According to the preceding technical solutions, on one hand, at the initial stage, the light emission control transistor is in the first on state under the control of the first light emission enable level so that a relatively small current flows through the light emission control transistor on the premise that the anode of the light-emitting element, the second electrode of the drive transistor, and the gate of the drive transistor can be reset in sequence. Therefore, the light emission control transistor has relatively small power consumption, facilitating the low power consumption of the pixel driving circuit. When the pixel driving circuit is applied to a display panel, the low power consumption of a silicon-based display panel can be facilitated and the application requirement of the silicon-based display panel for low power consumption can be satisfied. On the other hand, at the light emission stage, the light emission control transistor is in the second on state under the control of the second light emission enable level so that a relatively large current can flow through the light emission control transistor, and the anode of the light-emitting element can be quickly charged by the drive current provided by the drive transistor, so as to prevent the silicon-based display panel including the pixel driving circuit from a color shift. Meanwhile, at the threshold compensation stage, the threshold voltage of the drive transistor is provided to the first node for compensation so that the drive current provided by the drive transistor at the light emission stage is independent of the threshold voltage of the drive transistor, so as to prevent a threshold drift of the drive transistor from affecting the display uniformity of the display panel and solve the problem of display non-uniformity of the display panel. Additionally, at the data write stage, the voltage of the first node N1 is divided by the first capacitor and the second capacitor so that even if the enable level of the data signal written by the data write circuit to the second terminal of the first capacitor is a relatively large voltage, a voltage coupled to the second terminal of the first capacitor is proportional to a ratio of the capacitance value of the first capacitor to a sum of the capacitance values of the two capacitors (the first capacitor and the second capacitor). Therefore, by setting the capacitance values of the first capacitor and the second capacitor, the enable level of the data signal changes within a relatively large range and the potential of the first node changes within a relatively small range so that the brightness of the light-emitting element has different levels and can be adjusted with higher accuracy, improving the color richness of the image displayed by the display panel and the display quality of the display panel.

The preceding is the core idea of the present disclosure. Based on the embodiments of the present disclosure, all other embodiments obtained by those of ordinary skill in the art without creative work are within the scope of the present disclosure. Hereinafter, the technical solutions in the embodiments of the present disclosure are described clearly and completely in conjunction with the drawings in the embodiments of the present disclosure.

Figure 3:
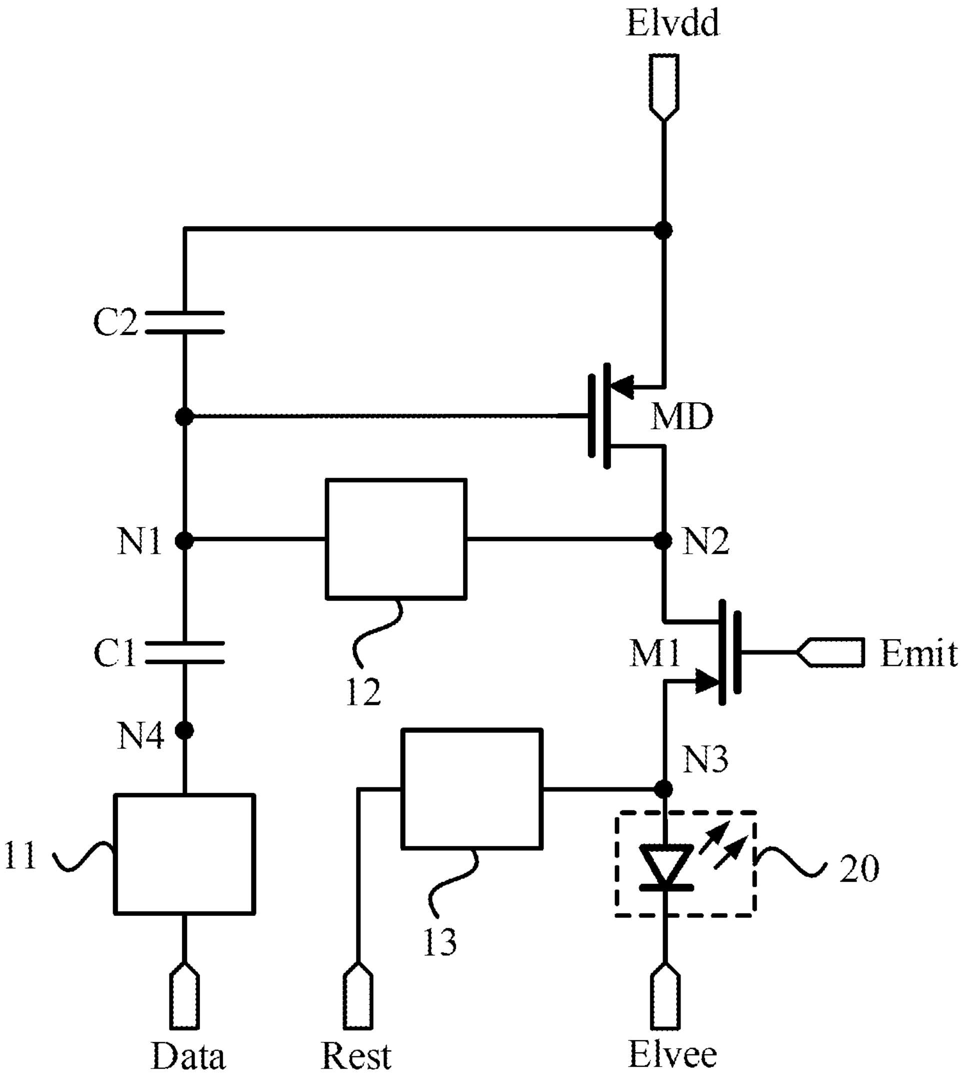
FIG. 3 is a structure diagram of a pixel driving circuit according to an embodiment of the present disclosure.

FIG. 3 is a structure diagram of a pixel driving circuit according to an embodiment of the present disclosure. As shown in FIG. 3, in the pixel driving circuit, a gate of a drive transistor MD, a first terminal of a first capacitor C1, a second terminal of a second capacitor C2, and a threshold compensation circuit 12 are electrically connected to a first node N1. A first terminal of the second capacitor C2 receives a fixed voltage signal which may be a positive power supply Elvdd. A first electrode of a light emission control transistor M1, a second electrode of the drive transistor MD, and the threshold compensation circuit 12 are electrically connected to a second node N2. A second electrode of the light emission control transistor M1, a reset circuit 13, and an anode of a light-emitting element 20 are electrically connected to a third node. A data write circuit 11 and a second terminal of the first capacitor C1 may be electrically connected to a fourth node N4.

It is to be understood that in the pixel driving circuit, the drive transistor MD may be a PMOS or n-type MOS (NMOS) transistor. Considering mobility, the drive transistor MD is typically the PMOS transistor. Correspondingly, the light emission control transistor M1 may also be a PMOS or NMOS transistor, which is not specifically limited in the embodiments of the present disclosure. When the light emission control transistor M1 is the PMOS transistor, the light emission control transistor M1 is turned on when a gate-source voltage difference of the light emission control transistor M1 is lower than or equal to a threshold voltage of the light emission control transistor M1, that is, the light emission control transistor M1 is turned on when a gate of the light emission control transistor M1 receives a light emission control signal Emit at a relatively low level which is an enable level of the light emission control signal Emit. When the light emission control transistor M1 is the NMOS transistor, the light emission control transistor M1 is turned on when the gate-source voltage difference of the light emission control transistor M1 is higher than or equal to the threshold voltage of the light emission control transistor M1, that is, the light emission control transistor M1 is turned on when the gate of the light emission control transistor M1 receives a light emission control signal Emit at a relatively high level which is the enable level of the light emission control signal Emit.

For ease of description, the technical solutions in the embodiments of the present disclosure are exemplarily described using an example in which the light emission control transistor M1 is the PMOS transistor.

Figure 4:
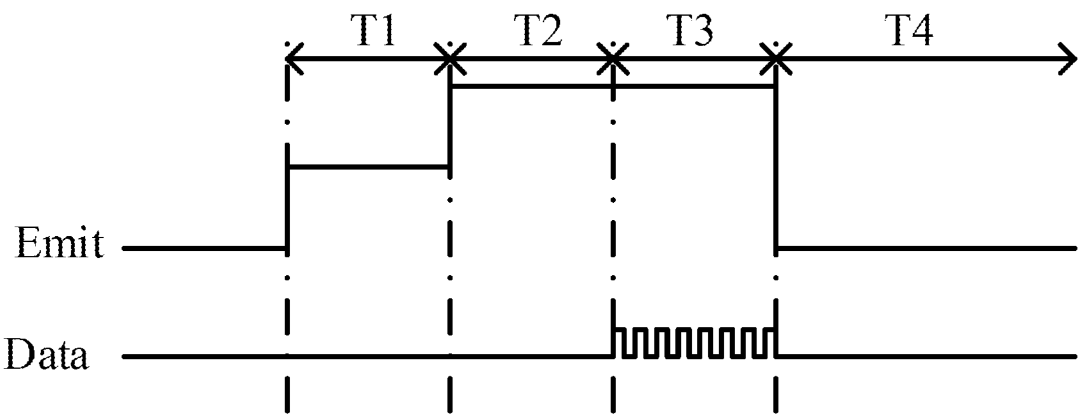
FIG. 4 is a drive timing diagram of the pixel driving circuit in FIG. 3.

FIG. 4 is a drive timing diagram of the pixel driving circuit in FIG. 3. As shown in FIGS. 3 and 4, at an initial stage T1, the reset circuit 13 provides a reset signal Rest to the third node N3 to reset the anode of the light-emitting element 20. The light emission control transistor M1 is in a first on state under the control of a first light emission enable level of the light emission control signal Emit to transmit the reset signal Rest from the third node N3 to the second node N2 to reset the second electrode of the drive transistor MD; the threshold compensation circuit 12 transmits the reset signal Rest from the second node N2 to the first node N1 to reset the first capacitor C1, the second capacitor C2, and the gate of the drive transistor MD; and the data write circuit 11 transmits a non-enable level Vofs of a data signal Data to the second terminal of the first capacitor C1. In this manner, at the initial stage T1, the light emission control transistor M1 is in the first on state so that a relatively small current flows through the light emission control transistor M1. Therefore, on the premise that the second node N2 and the first node N1 can be reset, the light emission control transistor M1 has relatively small power consumption, facilitating the low power consumption of the pixel driving circuit. When the pixel driving circuit is applied to a silicon-based display panel, the low power consumption of the silicon-based display panel is facilitated and the application requirement of the silicon-based display panel for low power consumption is satisfied. Moreover, when the initial stage T1 ends, the gate and the second electrode of the drive transistor MD have been reset, and the drive transistor MD changes from a bias state in a previous drive cycle to an initial state, so as to prevent a hysteresis effect of the drive transistor MD from affecting the subsequent working state of the drive transistor MD. Additionally, a voltage V across the first capacitor C1 is a voltage difference between the first node N1 and the fourth node N4. If a voltage drop caused by the reset circuit 13, the light emission control transistor M1, the threshold compensation circuit 12, and the data write circuit 11 is ignored, a voltage difference VC1 across the first capacitor C1 is equal to Rest−Vofs. That is, VC1=Rest−Vofs.

After the initial stage T1 ends, the pixel driving circuit enters a threshold compensation stage T2 at which a path is formed between the positive power supply Elvdd and the first node N1 so that a current signal passes through the drive transistor MD and the threshold compensation circuit 12 in sequence and charges the first node N1 until a potential VN1 of the first node N1 is Elvdd−Vth (that is, VN1=Elvdd−Vth), which is a critical point at which the drive transistor MD is turned off. Therefore, when the threshold compensation stage T2 ends, the potential of the first node N1 remains VN1. Vth denotes a threshold voltage of the drive transistor MD. In this manner, after the threshold compensation stage T2 ends, the potential of the first node N1 is related to the threshold voltage of the drive transistor MD so that the threshold compensation circuit 12 provides the threshold voltage of the drive transistor MD to the first node N1 for compensation. Meanwhile, at the threshold compensation stage T2, the data write circuit 11 keeps writing the non-enable level Vofs of the data signal Data to the second terminal of the first capacitor C1 so that the potential VN1 of the first node N1 is not coupled to the fourth node N4.

Therefore, when the threshold compensation stage T2 ends, the voltage difference across the first capacitor C1 becomes to be equal to VN1−Vofs.

After the threshold compensation stage T2 ends, the pixel driving circuit enters a data write stage T3 at which the data write circuit 11 writes an enable level Vdata of the data signal Data to the second terminal of the first capacitor C1 so that a potential of the second terminal of the first capacitor C1 changes from Vofs to Vdata, that is, the potential of the second terminal of the first capacitor C1 changes by ΔV=Vdata−Vofs. Meanwhile, due to a coupling effect of the first capacitor C1, the potential of the first node N1 electrically connected to the first terminal of the first capacitor C1 changes accordingly. Since the first node N1 is electrically connected to the second capacitor C2, a variation of the potential of the first node N1 is related to a voltage division of the first node N1 across the first capacitor C1 so that the potential of the first node N1 changes from VN1 to VN1', where VN1'=VN1−(Vdata−Vofs)×(c1/(c1+c2)). That is, the potential VN1' of the first node N1 is Elvdd−Vth−(Vdata−Vofs)×(c1/(c1+c2)), where c1 denotes a capacitance value of the first capacitor C1, and c2 denotes a capacitance value of the second capacitor C2. In this manner, even if the enable level Vdata of the data signal Data written by the data write circuit 11 to the fourth node N4 is a relatively large voltage signal, a signal coupled to the first node N1 is proportional to a ratio of the capacitance value of the first capacitor C1 to a sum of the capacitance values of the two capacitors (the first capacitor C1 and the second capacitor C2) so that the voltage is divided by the first capacitor C1 and the second capacitor C2. Compared with the data signal Data written to the fourth node N4, the variation of the first node N1 is relatively small so that the data signal Data can have a relatively large range to be in a one-to-one correspondence to 0 to 255 grayscales. Therefore, when the data write stage T3 ends, the potential of the first node N1 can also be in a one-to-one correspondence to the 0 to 255 grayscales.

After the data write stage T3 ends, the pixel driving circuit enters a light emission stage T4. At the light emission stage T4, the light emission control transistor M1 is in a second on state under the control of a second light emission enable level of the light emission control signal Emit so that a drive current $I_d$ generated by the drive transistor MD according to the potential VN1' of the first node N1 is transmitted to the light-emitting element 20 to drive the light-emitting element 20 to emit light. That is, the drive current $I_d$ provided by the drive transistor MD is expressed as follows:

$$I_d = \frac{1}{2}\mu C_{OX}\frac{W_P}{L_P}(V_{SGP} - |V_{thp}|)^2 = \frac{1}{2}\mu C_{OX}\frac{W_P}{L_P}\left((V_{data} - V_{ofs})*\left(\frac{c_1}{c_1 + c_2}\right)\right)^2.$$

Where μ denotes a carrier mobility of the drive transistor MD, $C_{ox}$ denotes a parasitic capacitance of the gate and a channel region of the drive transistor MD, and $W_p/L_p$ denotes a channel width-to-length ratio of the drive transistor MD. In this manner, at the light emission stage T4, the drive current $I_d$ provided by the drive transistor MD is independent of the threshold voltage Vth of the drive transistor MD so that the current provided by the drive transistor MD is controllable, improving the display uniformity of the display panel including the pixel driving circuit. Meanwhile, at the light emission stage T4, the light emission control transistor M1 is in the second on state, and a relatively large current can flow through the light emission control transistor M1 to quickly charge the anode of the light-emitting element

20 so that a voltage difference between the anode and a cathode of the light-emitting element 20 reaches a light emission threshold Voled of the light-emitting element 20 as soon as possible, that is, a voltage difference between a potential VN3 of the third node N3 and a negative power supply Elvee is greater than or equal to the light emission threshold Voled of the light-emitting element 20. In this manner, the time required for the light-emitting element 20 to reach stable brightness can be shortened, so as to avoid a significant color cast of the display panel due to a large difference between the times required for the light-emitting elements having different turn-on thresholds to be turned on and further improve the display effect of the display panel.

In the embodiments of the present disclosure, at the initial stage, the light emission control transistor is in the first on state under the control of the first light emission enable level so that a relatively small current flows through the light emission control transistor on the premise that the anode of the light-emitting element, the second electrode of the drive transistor, and the gate of the drive transistor can be reset in sequence. Therefore, the light emission control transistor has relatively small power consumption, facilitating the low power consumption of the pixel driving circuit. When the pixel driving circuit is applied to the display panel, the low power consumption of the silicon-based display panel can be facilitated and the application requirement of the silicon-based display panel for low power consumption can be satisfied. Moreover, at the light emission stage, the light emission control transistor is in the second on state under the control of the second light emission enable level so that a relatively large current can flow through the light emission control transistor, and the anode of the light-emitting element can be quickly charged by the drive current provided by the drive transistor, so as to prevent the silicon-based display panel including the pixel driving circuit from the color cast. Additionally, at the threshold compensation stage, the threshold voltage of the drive transistor is provided to the first node for compensation so that the drive current provided by the drive transistor at the light emission stage is independent of the threshold voltage of the drive transistor, so as to prevent a threshold drift of the drive transistor from affecting the display uniformity of the display panel and solve the problem of display non-uniformity of the display panel. Additionally, at the data write stage, the voltage of the first node is divided by the first capacitor and the second capacitor so that even if the enable level of the data signal written by the data write circuit to the second terminal of the first capacitor is a relatively large voltage, a voltage coupled to the second terminal of the first capacitor is proportional to the ratio of the capacitance value of the first capacitor to the sum of the capacitance values of the two capacitors (the first capacitor and the second capacitor). Therefore, by setting the capacitance values of the first capacitor and the second capacitor, the enable level of the data signal changes within a relatively large range and the potential of the first node changes within a relatively small range so that the brightness of the light-emitting element has different levels and can be adjusted with higher accuracy, improving the color richness of the image displayed by the display panel and the display quality of the display panel.

Optionally, at the threshold compensation stage, the reset circuit continuously provides the reset signal to the third node. In this manner, the third node remains the voltage of the reset signal at the threshold compensation stage, that is, the third node remains a fixed voltage signal at the threshold compensation stage, and the fixed voltage signal is not sufficient to control the light-emitting element to emit light so that the third node is prevented from being charged by a leakage current generated by the light emission control transistor and from reaching the light emission voltage of the light-emitting element, preventing undesired light emission of a pixel.

It is to be noted that the threshold compensation circuit, the reset circuit, and the data write circuit in the embodiments of the present disclosure may be active elements and/or passive elements. The active element includes, for example, a transistor, and the passive element includes, for example, a resistor, a capacitor, an inductor, and the like. On the premise that the functions of the circuits can be implemented, the structures of the threshold compensation circuit, the reset circuit, and the data write circuit are not specifically limited in the embodiments of the present disclosure.

The technical solutions in the embodiments of the present disclosure are described below by way of typical examples.

Figure 5:
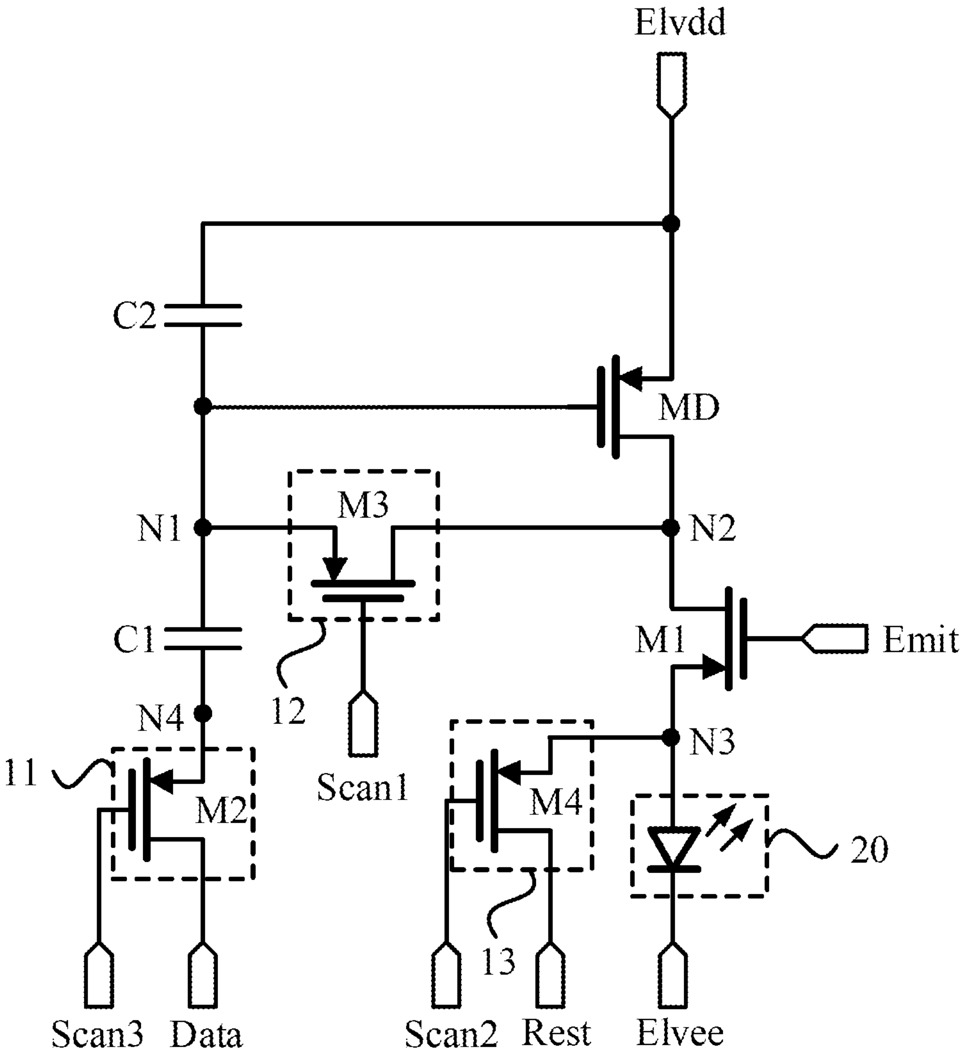
FIG. 5 is a diagram showing specific circuit structures of a pixel driving circuit according to an embodiment of the present disclosure.

Optionally, FIG. 5 is a diagram showing specific circuit structures of a pixel driving circuit according to an embodiment of the present disclosure. As shown in FIG. 5, the reset circuit 13 includes a reset transistor M4, and the threshold compensation circuit 12 includes a threshold compensation transistor M3. Where the reset transistor M4 has a first electrode for receiving the reset signal Rest, a second electrode electrically connected to the third node N3, and a gate for receiving a second scan signal Scan2 and is configured to be turned on or off under the control of the second scan signal Scan2. The threshold compensation transistor M3 has a gate for receiving a first scan signal Scan1, a first electrode electrically connected to the first node N1, and a second electrode electrically connected to the second node N2 and is configured to be turned on or off under the control of the first scan signal Scan1.

Correspondingly, the data write circuit 11 may include a data write transistor M2. The data write transistor M2 has a first electrode for receiving the data signal Data which includes the enable level Vdata and the non-enable level Vofs, a second electrode electrically connected to the fourth node N4, and a gate for receiving a third scan signal Scan3 so that the data write transistor M2 is turned on or off under the control of the third scan signal Scan3.

The reset transistor M4, the threshold compensation transistor M3, and the data write transistor M2 may also be NMOS or PMOS transistors. The NMOS transistor is turned on when a scan signal received by a gate of the NMOS transistor is at a high level and is turned off when the scan signal is at a low level. The PMOS transistor is turned on when a scan signal received by a gate of the PMOS transistor is at a low level and is turned off when the scan signal is at a high level. The types of the reset transistor M4, the threshold compensation transistor M3, and the data write transistor M2 are not specifically limited in the embodiments of the present disclosure. For ease of description, the technical solutions in the embodiments of the present disclosure are exemplarily described below using an example in which all transistors in the pixel driving circuit are PMOS transistors.

Figure 6:
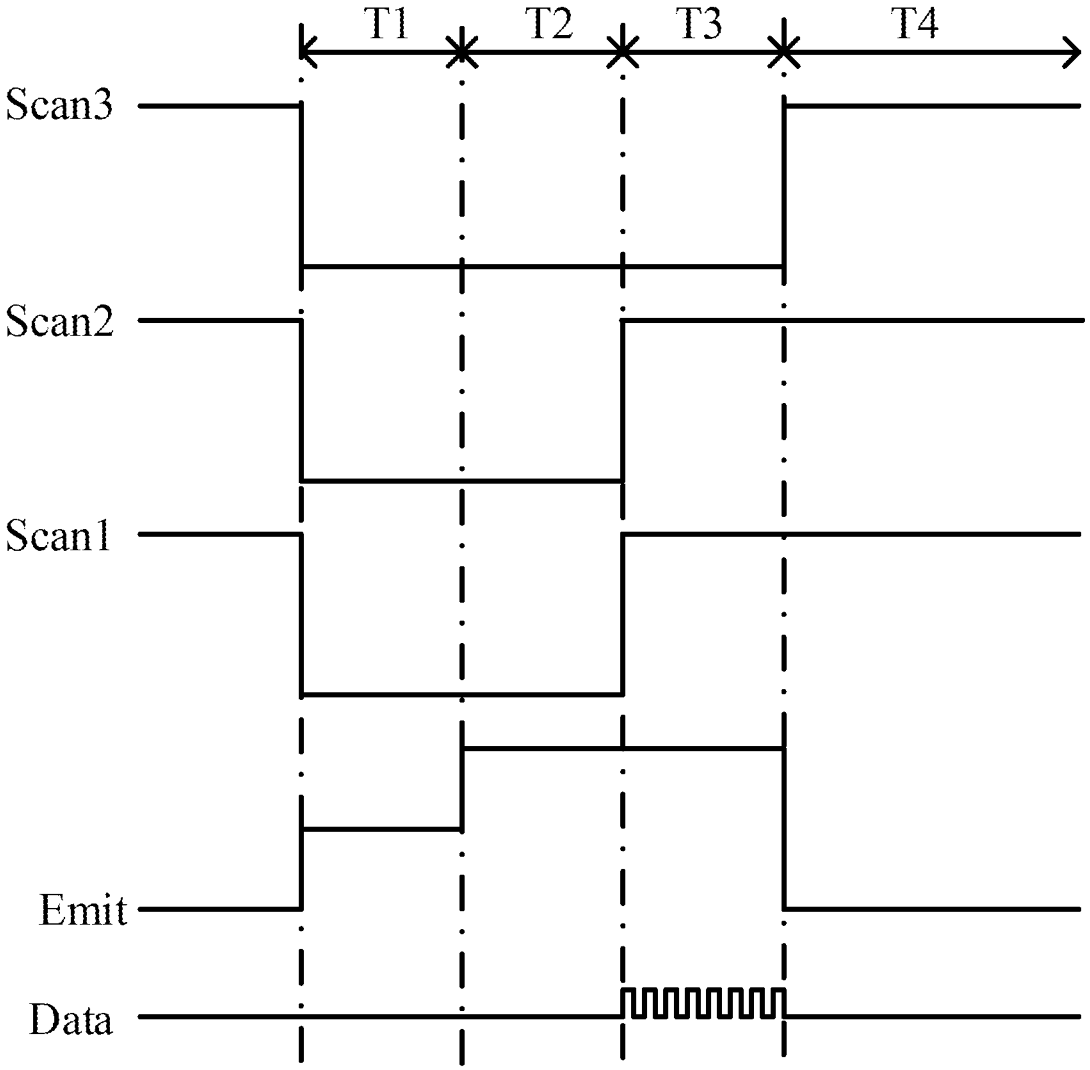
FIG. 6 is a drive timing diagram of the pixel driving circuit in FIG. 5.

For example, FIG. 6 is a drive timing diagram of a pixel driving circuit in FIG. 5. As shown in FIGS. 5 and 6, at the initial stage T1, the threshold compensation transistor M3 is turned on under the control of the first scan signal Scant, the reset transistor M4 is turned on under the control of the second scan signal Scan2, the data write transistor M2 is turned on under the control of the third scan signal Scan3, the light emission control transistor M1 is turned on under the control of the first light emission enable level of the light emission control signal Emit, the non-enable level Vofs of the data signal Data is written to the fourth node N4 through the data write transistor M2 that is on, and the reset signal Rest is written to the anode of the light-emitting element 20 through the reset transistor M4 that is on, transmitted to the second node N2 through the light emission control transistor M1 in the first on state, and written to the first node N1 through the threshold compensation transistor M3 that is on, so as to reset the anode of the light-emitting element 20, the second electrode of the drive transistor, and the gate of the drive transistor, respectively.

At the threshold compensation stage T2, the threshold compensation transistor M3 remains on under the control of the first scan signal Scant, the reset transistor M4 remains on under the control of the second scan signal Scan2, the data write transistor M2 remains on under the control of the third scan signal Scan3, the light emission control transistor M1 is turned off under the control of the light emission non-enable level of the light emission control signal Emit, the third node N3 remains the voltage of the reset signal Rest, and a current through the drive transistor MD and the threshold compensation transistor M3 continuously charges the first node N1 until the potential of the first node N1 becomes VN1=Elvdd−Vth so that the threshold voltage Vth of the drive transistor MD is provided to the first node N1 for compensation. Meanwhile, the fourth node N4 remains the non-enable level Vofs of the data signal Data.

At the data write stage T3, the threshold compensation transistor M3 is turned off under the control of the first scan signal Scant, the reset transistor M4 is turned off under the control of the second scan signal Scan2, the data write transistor M2 remains on under the control of the third scan signal Scan3, the light emission control transistor M1 remains off under the control of the light emission non-enable level of the light emission control signal Emit, the enable level Vdata of the data signal Data is written to the fourth node N4 through the data write transistor M2 that is on so that a potential of the fourth node N4 changes from the non-enable level Vofs of the data signal Data to the enable level Vdata of the data signal Data, and the potential of the first node N1 changes from VN1 to VN1' through the coupling effect of the first capacitor C1 and a voltage division effect of the second capacitor C2, so that the data signal is written.

At the light emission stage T4, the threshold compensation transistor M3 remains off under the control of the first scan signal Scant, the reset transistor M4 remains off under the control of the second scan signal Scan2, the data write transistor M2 is turned off under the control of the third scan signal Scan3, and the light emission control transistor M1 is in the second on state under the control of the second light emission enable level of the light emission control signal Emit so that a current path is formed between the positive power supply Elvdd and the negative power supply Elvee, and a relatively large current may flow through the light emission control transistor M1 to quickly drive the light-emitting element 20 to stably emit light.

Figure 7:
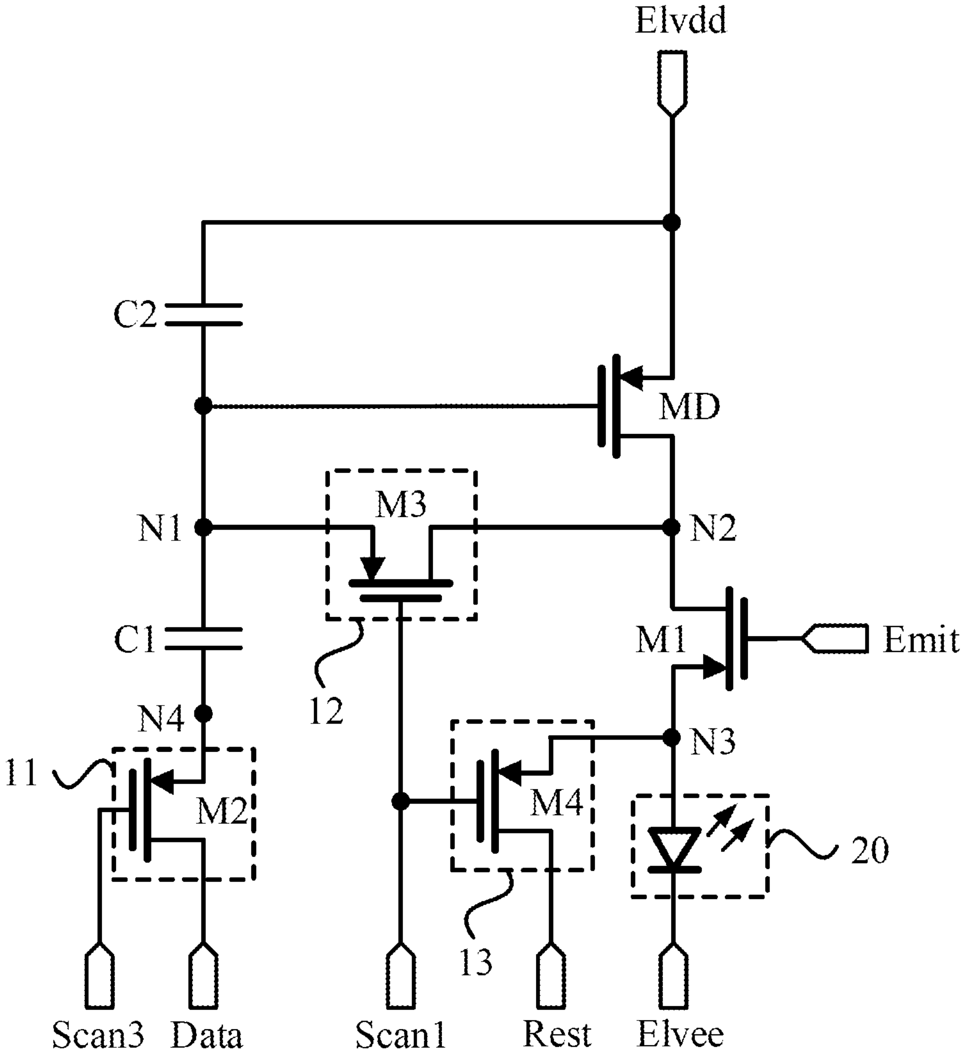
FIG. 7 is a diagram showing specific circuit structures of another pixel driving circuit according to an embodiment of the present disclosure.

As can be seen from the preceding analysis, the threshold compensation transistor and the reset transistor are on at the same stages so that when the reset transistor and the threshold compensation transistor are of the same channel type, the gates of the reset transistor and the threshold compensation transistor receive the same scan signal. In this case, as shown in FIG. 7, the first scan signal Scan1 for controlling the reset transistor M4 to be turned on or off may also serve as the second scan signal for controlling the threshold compensation transistor M3 to be turned on or off, which can reduce the number of signals provided to the pixel driving circuit, reduce the number of ports for receiving signals in the pixel driving circuit, simplify the structure of the pixel driving circuit, and reduce the cost of the pixel driving circuit.

Figure 8:
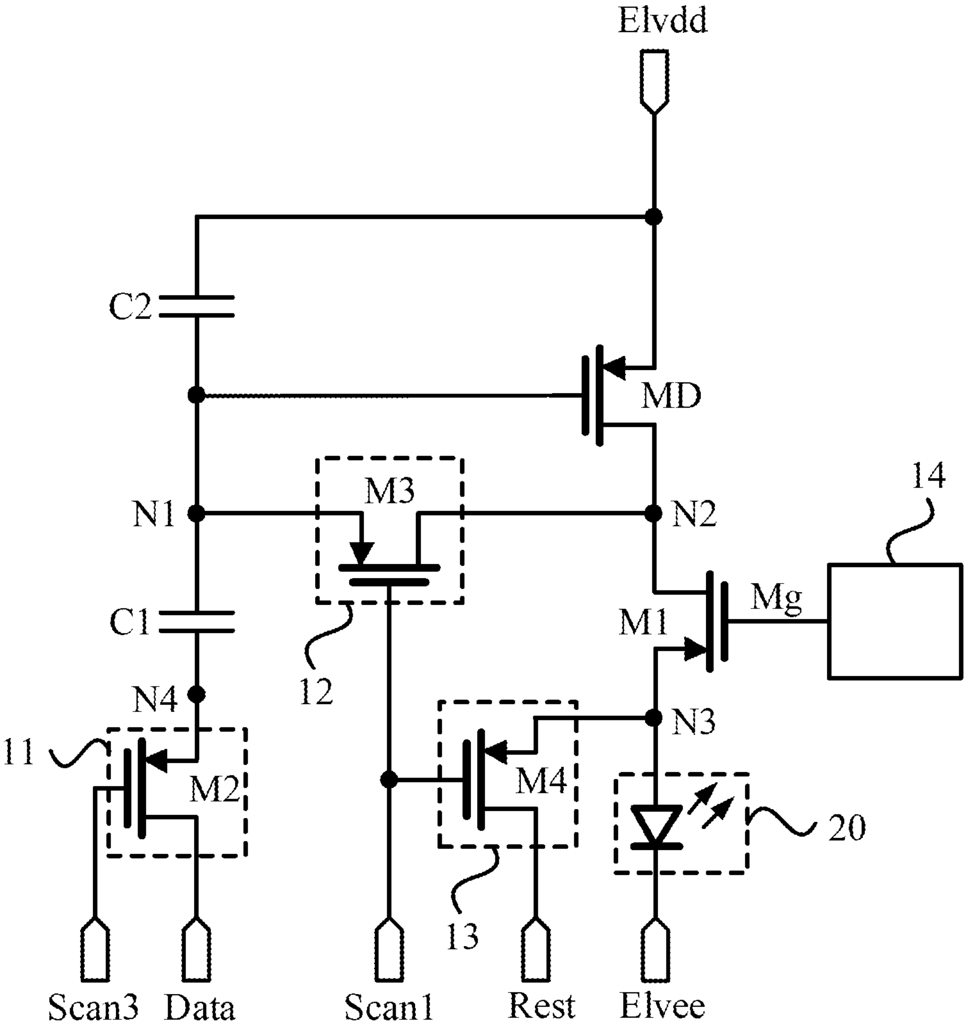
FIG. 8 is a structure diagram of another pixel driving circuit according to an embodiment of the present disclosure.

On the basis of the preceding embodiments, optionally, FIG. 8 is a structure diagram of another pixel driving circuit according to an embodiment of the present disclosure. As shown in FIG. 8, the pixel driving circuit further includes a signal conversion circuit 14 electrically connected to the gate Mg of the light emission control transistor M1. The signal conversion circuit 14 is configured to provide, at the initial stage, the first light emission enable level to the gate Mg of the light emission control transistor M1 to control the light emission control transistor M1 to be in the first on state, provide, at the threshold compensation stage and the data write stage, the light emission non-enable level to the gate Mg of the light emission control transistor M1 to control the light emission control transistor M1 to be in an off state, and provide, at the light emission stage, the second light emission enable level to the gate Mg of the light emission control transistor M1 to control the light emission control transistor M1 to be in the second on state.

In this manner, the signal conversion circuit can provide different light emission control signals at different stages to control the light emission control transistor to be in different on states so that the drive transistor is reset and the light-emitting element is promoted to enter a stable light emission stage at the light emission stage, improving the light emission accuracy of the light-emitting element while ensuring that the pixel driving circuit has lower power consumption.

Figure 9:
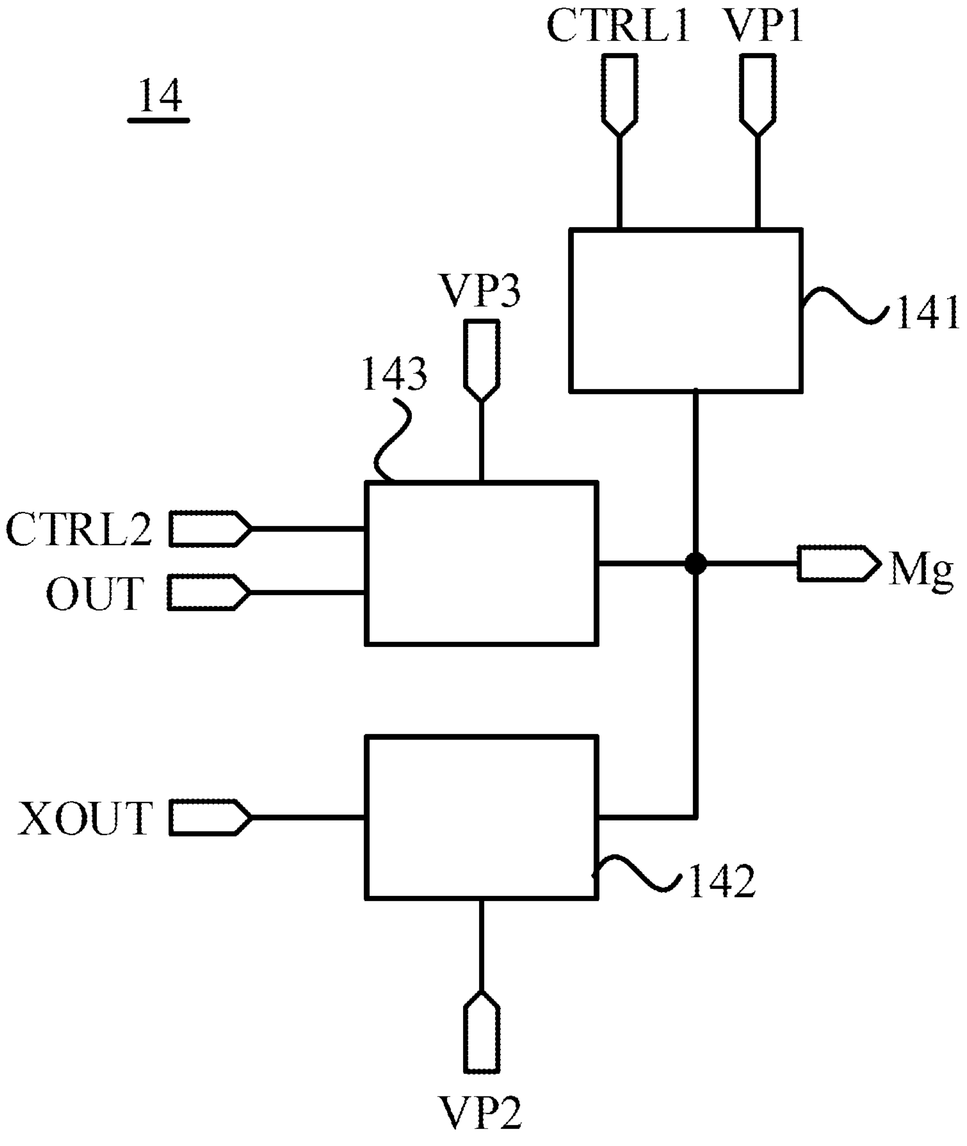
FIG. 9 is a structure diagram of a signal conversion circuit according to an embodiment of the present disclosure.

Optionally, FIG. 9 is a structure diagram of a signal conversion circuit according to an embodiment of the present disclosure. As shown in FIGS. 8 and 9, the signal conversion circuit 14 includes a first enable level conversion circuit 141, a second enable level conversion circuit 142, and a third enable level conversion circuit 143; where the first enable level conversion circuit 141 is electrically connected to a first level signal terminal VP1, a first logic control signal terminal CTRL1, and the gate Mg of the light emission control transistor M1 and configured to provide the first light emission enable level from the first level signal terminal VP1 to the gate Mg of the light emission control transistor M1 under the control of a first logic control signal Ctrl1 from the first logic control signal terminal CTRL1; the second enable level conversion circuit 142 is electrically connected to a first light emission control signal terminal XOUT, a second level signal terminal VP2, and the gate Mg of the light emission control transistor M1 and configured to provide the second light emission enable level from the second level signal terminal VP2 to the gate Mg of the light emission control transistor M1 under the control of a first light emission control signal outputted from the first light emission control signal terminal XOUT; and the third enable level conversion circuit 143 is electrically connected to a second logic control signal terminal CTRL2, a second light emission control signal terminal OUT, a third level signal terminal VP3, and the gate Mg of the light emission control transistor M1 and configured to provide the light emission non-enable level from the third level signal terminal VP3 to the gate Mg of the light emission control transistor M1 under the control of a second light emission control signal outputted from the second light emission control signal terminal OUT and a second logic control signal outputted from the second logic control signal terminal CTRL2.

Specifically, at the initial stage, the first enable level conversion circuit 141 transmits the first light emission enable level from the first level signal terminal VP1 to the gate Mg of the light emission control transistor M1 under the control of the first logic control signal Ctrl1 from the first logic control signal terminal CTRL1 so that the light emission control transistor M1 can be in the first on state and the reset signal of the third node N3 can be transmitted to the second node N2 and the first node N1 in sequence to reset the anode of the light-emitting element 20 and the gate and the second electrode of the drive transistor MD. At the threshold compensation stage and the data write stage, the third enable level conversion circuit 143 transmits the light emission non-enable level from the third level signal terminal VP3 to the gate Mg of the light emission control transistor M1 under the control of the second light emission control signal outputted from the second light emission control signal terminal OUT and the second logic control signal outputted from the second logic control signal terminal CTRL2 so that the light emission control transistor M1 is in the off state, and the third node N3 is prevented from being charged by the corresponding electrical signal, so as to prevent the undesired light emission of the pixel. At the light emission stage, the second enable level conversion circuit 142 transmits the second light emission enable level from the second level signal terminal VP2 to the gate Mg of the light emission control transistor M1 under the control of the first light emission control signal outputted from the first light emission control signal terminal XOUT so that the light emission control transistor M1 is in the second on state, the drive current provided by the drive transistor MD can be quickly transmitted to the anode of the light-emitting element 20 to charge the anode of the light-emitting element 20, and thus the light-emitting element 20 quickly enters the stable light emission stage.

The first enable level conversion circuit 141, the second enable level conversion circuit 142, and the third enable level conversion circuit 143 may be composed of various elements. The specific structures of the first enable level conversion circuit 141, the second enable level conversion circuit 142, and the third enable level conversion circuit 143 are not limited in the embodiments of the present disclosure.

Figure 10:
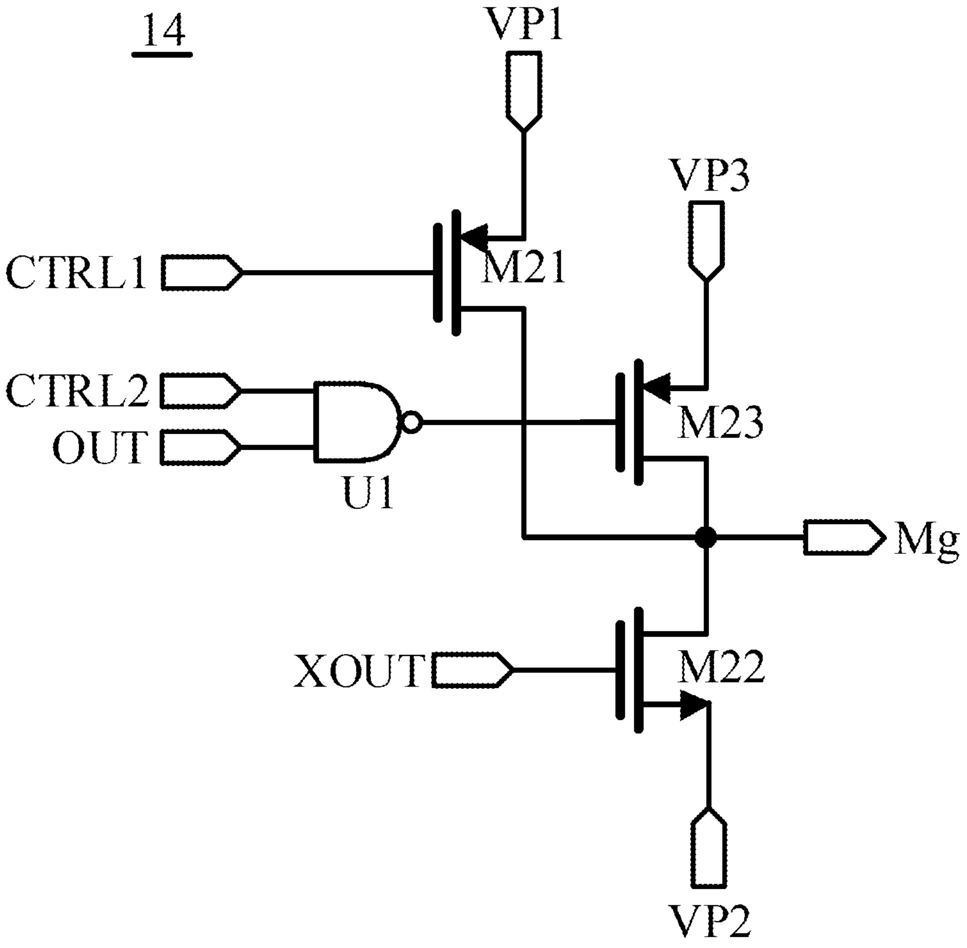
FIG. 10 is a diagram showing specific circuit structures of a signal conversion circuit according to an embodiment of the present disclosure.

For example, FIG. 10 is a diagram showing specific circuit structures of a signal conversion circuit according to an embodiment of the present disclosure. As shown in FIGS. 9 and 10, the first enable level conversion circuit 141 includes a first transistor M21 which has a gate electrically connected to the first logic control signal terminal CTRL1, a first electrode electrically connected to the first level signal terminal VP1, and a second electrode electrically connected to the gate Mg of the light emission control transistor; the second enable level conversion circuit 142 includes a second transistor M22 which has a gate electrically connected to the first light emission control signal terminal XOUT, a first electrode electrically connected to the second level signal terminal VP2, and a second electrode electrically connected to the gate Mg of the light emission control transistor; and the third enable level conversion circuit 143 includes a NAND gate U1 and a third transistor M23, where the NAND gate U1 has a first input terminal electrically connected to the second logic control signal terminal CTRL2, a second input terminal electrically connected to the second light emission control signal terminal OUT, and an output terminal electrically connected to a gate of the third transistor M23; and the third transistor M23 further has a first electrode electrically connected to the third level signal terminal VP3 and a second electrode electrically connected to the gate Mg of the light emission control transistor.

It is to be noted that FIG. 10 is only an example drawing in the embodiments of the present disclosure and only shows the channel types of transistors for example. On the premise that the functions of the level conversion circuits can be implemented, the channel types of the transistors in the level conversion circuits are not specifically limited in the embodiments of the present disclosure.

For ease of description, the technical solutions in the embodiments of the present disclosure are exemplarily described below using an example in which the first transistor M21 and the third transistor M23 are PMOS transistors and the second transistor M22 is an NMOS transistor.

Figure 11:
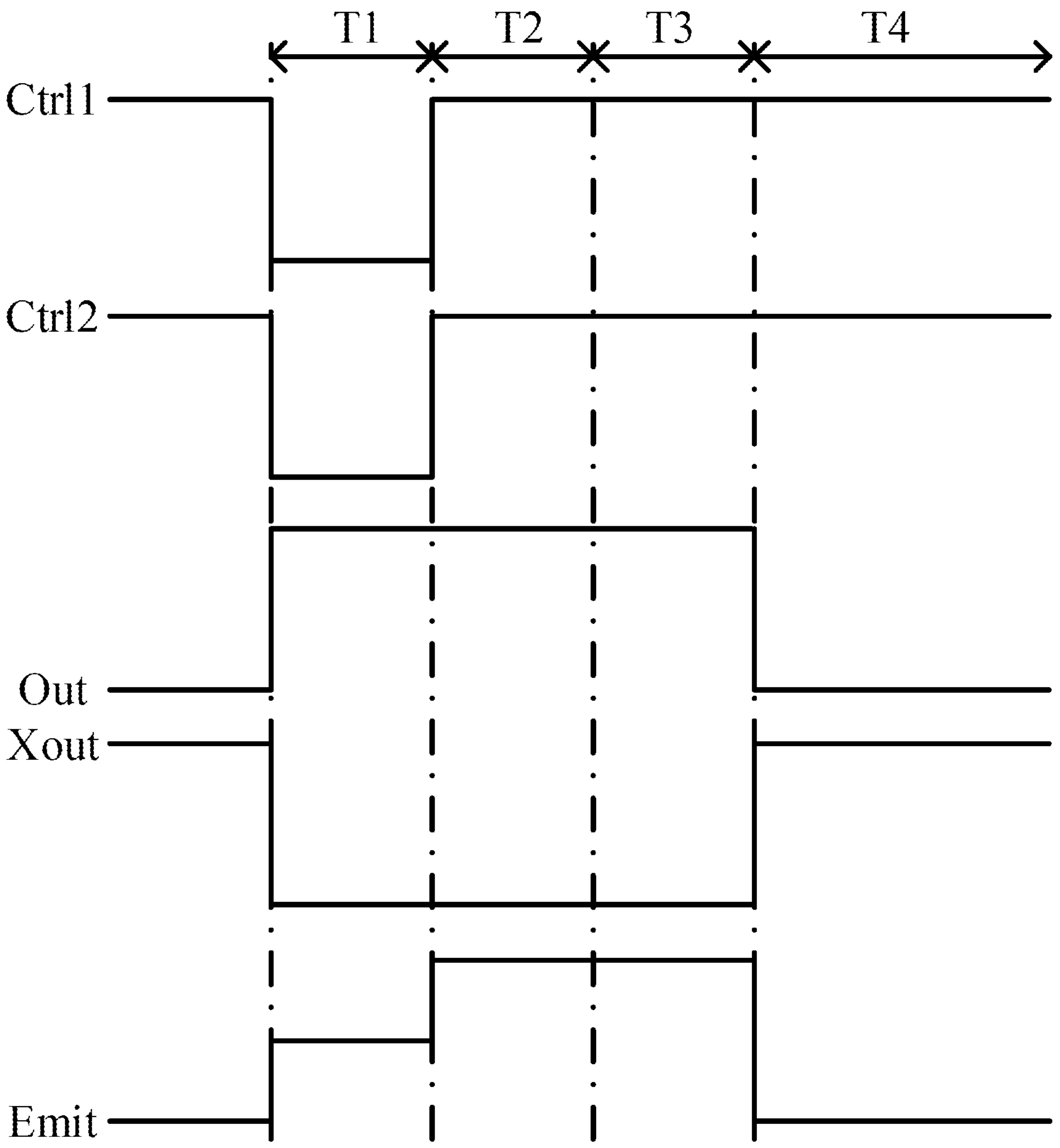
FIG. 11 is a drive timing diagram of the signal conversion circuit in FIG. 10.

FIG. 11 is a drive timing diagram of a signal conversion circuit in FIG. 10. As shown in FIGS. 10 and 11, at the initial stage T1, the first logic control signal Ctrl1 from the first logic control signal terminal CTRL1 is at a low level so that the first transistor M21 is turned on, the first light emission enable level from the first level signal terminal VP1 is transmitted as the first light emission enable level of the light emission control signal Emit to the gate Mg of the light emission control transistor through the first transistor M21 that is on, and thus the light emission control transistor is in the first on state. Correspondingly, the second logic control signal Ctrl2 from the second logic control signal terminal CTRL2 is a low level, and the second light emission control signal Out from the second light emission control signal terminal OUT is at a high level so that the NAND gate U1 outputs a logic high level signal to control the third transistor M23 to be in the off state. Meanwhile, the first light emission control signal Xout from the first light emission control signal terminal XOUT is at a low level so that the second transistor M22 is also in the off state.

At the threshold compensation stage T2 and the data write stage T3, the first logic control signal Ctrl1 from the first logic control signal terminal CTRL1 is at a high level so that the first transistor M21 is in the off state; the second logic control signal Ctrl2 from the second logic control signal terminal CTRL2 is at a high level, and the second light emission control signal Out from the second light emission control signal terminal OUT is also at a high level so that the NAND gate U1 outputs a logic low level signal to control the third transistor M23 to be in an on state, the light emission non-enable level from the third level signal terminal VP3 is transmitted as the light emission control signal Emit to the gate Mg of the light emission control transistor through the third transistor M23 that is on, and the light emission control transistor is controlled to be in the off state; the first light emission control signal Xout from the first light emission control signal terminal XOUT is at a low level so that the second transistor M22 remains off.

At the light emission stage T4, the first logic control signal Ctrl1 from the first logic control signal terminal CTRL1 remains at the high level so that the first transistor M21 remains off the second logic control signal Ctrl2 from the second logic control signal terminal CTRL2 is at a high level, and the second light emission control signal Out from the second light emission control signal terminal OUT is at a low level so that the NAND gate U1 outputs a logic high level signal to control the third transistor M23 to be in the off state; the first light emission control signal Xout from the first light emission control signal terminal XOUT is at a high level so that the second transistor M22 is in the on state, the second light emission enable level from the second level signal terminal VP2 is transmitted as the light emission control signal Emit to the gate Mg of the light emission control transistor through the second transistor M22 that is on, and thus the light emission control transistor is in the second on state.

The first transistor M21 and the third transistor M23 are both the PMOS transistors, and the first logic control signal Ctrl1 from the first logic control signal terminal CTRL1 is the same as the second logic control signal Ctrl2 from the second logic control signal terminal CTRL2 so that the first logic control signal terminal CTRL1 may also serve as the second logic control signal terminal CTRL2. That is, when the first transistor M21 and the third transistor M23 are of the same channel type, the first logic control signal terminal CTRL1 may also serve as the second logic control signal terminal CTRL2, so as to reduce the number of signals provided to the signal conversion circuit.

Correspondingly, the second transistor M22 is the NMOS transistor, the third transistor M23 is the PMOS transistor, and the first light emission control signal Xout from the first light emission control signal terminal XOUT is reverse to the second light emission control signal Out from the second light emission control signal terminal OUT, that is, when the second transistor M22 and the third transistor M23 are of different channel types, the first light emission control signal Xout is reverse to the second light emission control signal Out.

Figure 12:
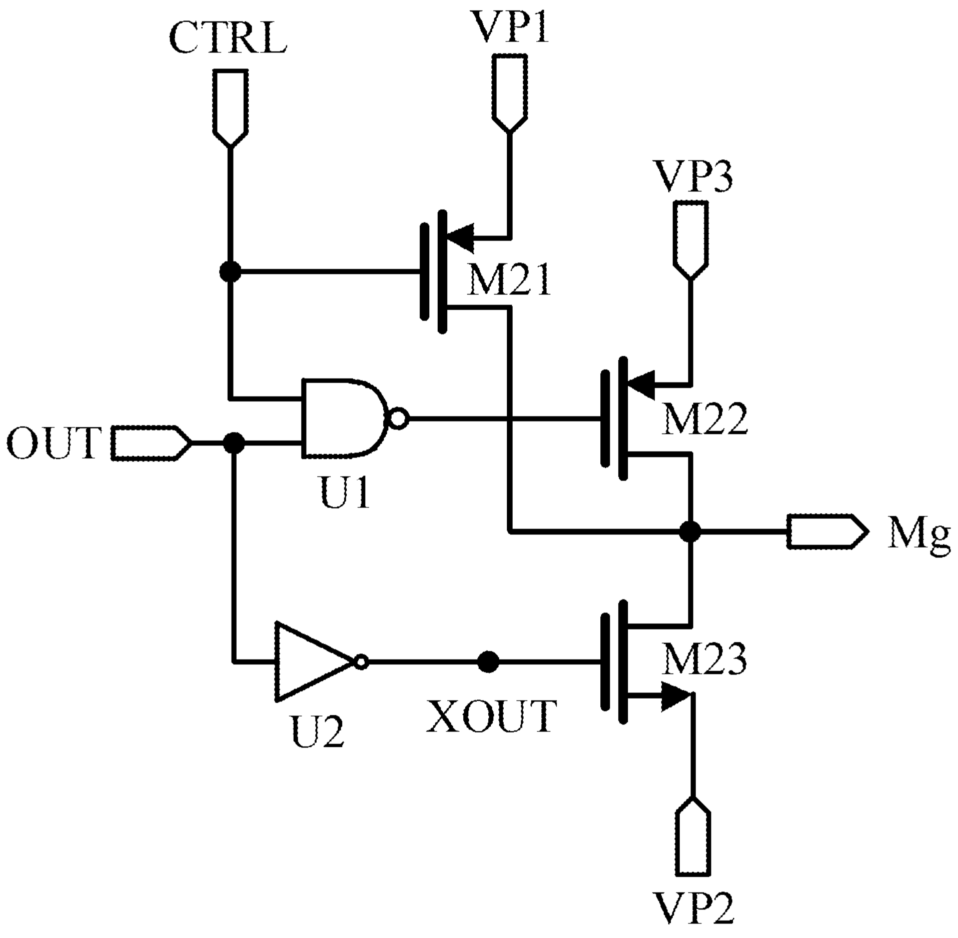
FIG. 12 is a diagram showing specific circuit structures of another signal conversion circuit according to an embodiment of the present disclosure.

Optionally, FIG. 12 is a diagram showing specific circuit structures of another signal conversion circuit according to an embodiment of the present disclosure. As shown in FIG. 12, the signal conversion circuit may further include a first phase inverter U2 which may be electrically connected between the first light emission control signal terminal XOUT and the second light emission control signal terminal OUT. In this manner, only the first light emission control signal Xout is provided to the first light emission control signal terminal XOUT of the signal conversion circuit, or only the second light emission control signal Out is provided to the second light emission control signal terminal OUT, so as to reduce the number of signals provided to the signal conversion circuit.

Figure 13:
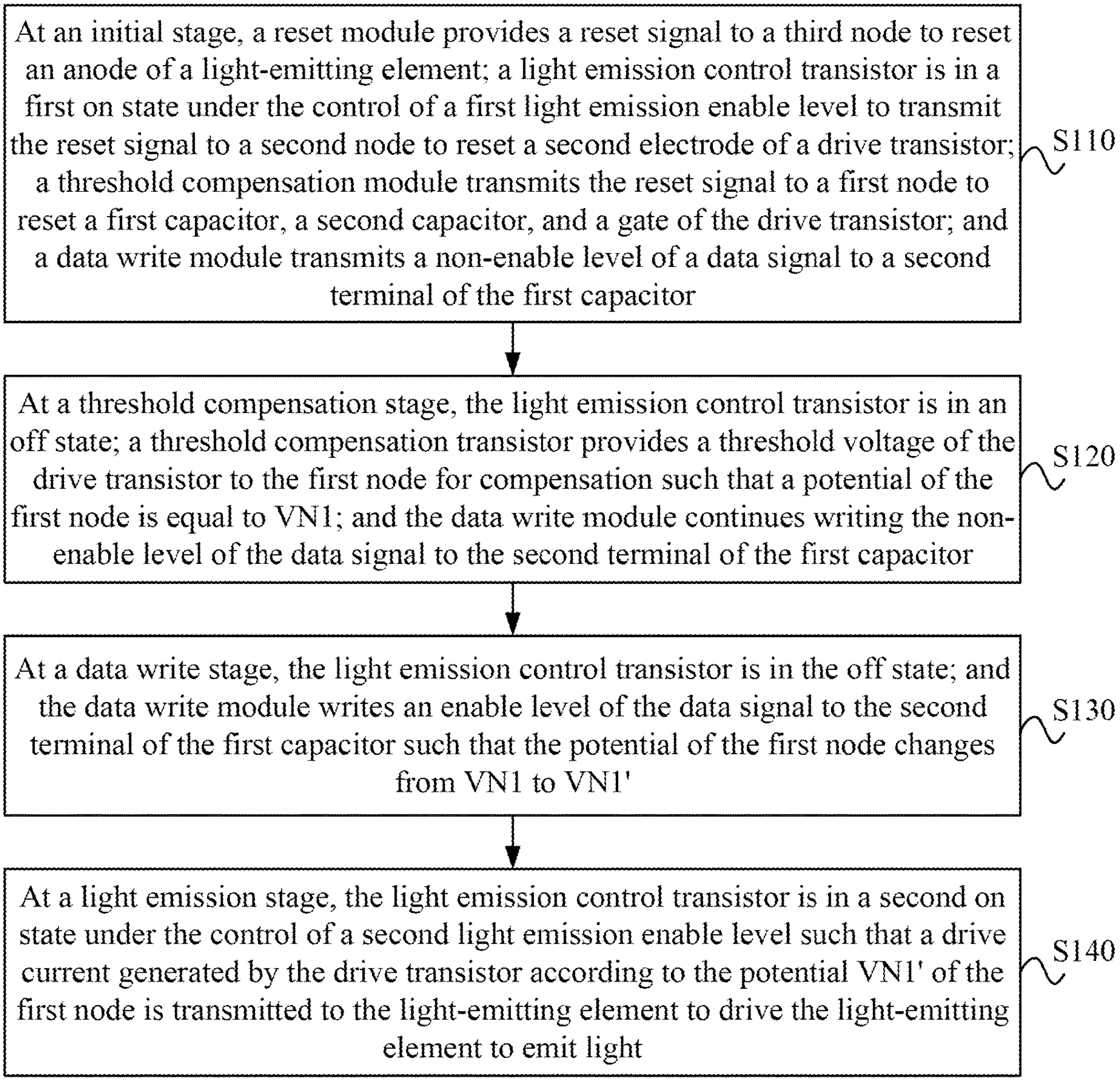
FIG. 13 is a flowchart of a method for driving a pixel driving circuit according to an embodiment of the present disclosure.

Based on the same inventive concept, the embodiments of the present disclosure further provide a method for driving a pixel driving circuit. The method is used for driving the pixel driving circuit provided by the embodiments of the present disclosure. FIG. 13 is a flowchart of a method for driving a pixel driving circuit according to an embodiment of the present disclosure. As shown in FIG. 13, the method for driving a pixel driving circuit includes steps described below.

In S110, at an initial stage, a reset circuit provides a reset signal to a third node to reset an anode of a light-emitting element; a light emission control transistor is in a first on state under the control of a first light emission enable level to transmit the reset signal to a second node to reset a second electrode of a drive transistor; a threshold compensation circuit transmits the reset signal to a first node to reset a first capacitor, a second capacitor, and a gate of the drive transistor; and a data write circuit transmits a non-enable level of a data signal to a second terminal of the first capacitor.

In S120, at a threshold compensation stage, the light emission control transistor is in an off state; a threshold compensation transistor provides a threshold voltage of the drive transistor to the first node for compensation such that a potential of the first node is equal to VN1; and the data write circuit continues writing the non-enable level of the data signal to the second terminal of the first capacitor.

In S130, at a data write stage, the light emission control transistor is in the off state; and the data write circuit writes an enable level of the data signal to the second terminal of the first capacitor such that the potential of the first node changes from VN1 to VN1'.

VN1'=VN1−(Vdata−Vofs)×(c1/(c1+c2)), where Vdata denotes the enable level of the data signal, Vofs denotes the non-enable level of the data signal, c1 denotes a capacitance value of the first capacitor, and c2 denotes a capacitance value of the second capacitor.

In S140, at a light emission stage, the light emission control transistor is in a second on state under the control of a second light emission enable level such that a drive current generated by the drive transistor according to the potential VN1' of the first node is transmitted to the light-emitting element to drive the light-emitting element to emit light.

A smaller current flows through the light emission control transistor in the first on state than the light emission control transistor in the second on state.

In this manner, at the initial stage, the light emission control transistor is in the first on state under the control of the first light emission enable level so that a relatively small current flows through the light emission control transistor on the premise that the anode of the light-emitting element, the second electrode of the drive transistor, and the gate of the drive transistor can be reset in sequence. Therefore, the light emission control transistor has relatively small power consumption, facilitating the low power consumption of the pixel driving circuit. When the pixel driving circuit is applied to a display panel, the low power consumption of a silicon-based display panel can be facilitated and the application requirement of the silicon-based display panel for low power consumption can be satisfied. Moreover, at the light emission stage, the light emission control transistor is in the second on state under the control of the second light emission enable level so that a relatively large current can flow through the light emission control transistor, and the anode of the light-emitting element can be quickly charged by the drive current provided by the drive transistor, so as to prevent the silicon-based display panel including the pixel driving circuit from a color cast. Additionally, at the threshold compensation stage, the threshold voltage of the drive transistor is provided to the first node for compensation so that the drive current provided by the drive transistor at the light emission stage is independent of the threshold voltage of the drive transistor, so as to prevent a threshold drift of the drive transistor from affecting the display uniformity of the display panel and solve the problem of display non-uniformity of the display panel. Additionally, at the data write stage, the voltage of the first node is divided by the first capacitor and the second capacitor so that even if the enable level of the data signal written by the data write circuit to the second terminal of the first capacitor is a relatively large voltage, a voltage coupled to the second terminal of the first capacitor is proportional to a ratio of the capacitance value of the first capacitor to a sum of the capacitance values of the two capacitors (the first capacitor and the second capacitor). Therefore, by setting the capacitance values of the first capacitor and the second capacitor, the enable level of the data signal changes within a relatively large range and the potential of the first node changes within a relatively small range so that the brightness of the light-emitting element has different levels and can be adjusted with higher accuracy, improving the color richness of the image displayed by the display panel and the display quality of the display panel.

Optionally, at the threshold compensation stage, the reset circuit continuously provides the reset signal to the third node. In this manner, the third node remains the voltage of the reset signal at the threshold compensation stage, that is, the third node remains a fixed voltage signal at the threshold compensation stage, and the fixed voltage signal is not sufficient to control the light-emitting element to emit light so that the third node is prevented from being charged by a leakage current generated by the light emission control transistor and from reaching the light emission voltage of the light-emitting element, preventing undesired light emission of a pixel.

Based on the same inventive concept, the embodiments of the present disclosure further provide a silicon-based display panel. The silicon-based display panel includes a plurality of light-emitting elements and a plurality of pixel driving circuits arranged in an array. The plurality of pixel driving circuits are configured to drive the plurality of light-emitting elements to emit light. The pixel driving circuit is provided by the embodiments of the present disclosure. Therefore, the silicon-based display panel provided by the embodiments of the present disclosure includes the technical features of the pixel driving circuit provided by the embodiments of the present disclosure and has the beneficial effects of the pixel driving circuit provided by the embodiments of the present disclosure. For the same content, reference may be made to the description of the pixel driving circuit provided by the embodiments of the present disclosure. The details are not repeated here.

The silicon-based display panel includes a silicon-based substrate, and the pixel driving circuits and the light-emitting elements in the silicon-based display panel are all formed on one side of the silicon-based substrate. That is, various devices of the silicon-based display panel may be formed on the silicon-based substrate using CMOS technology. Since a device formed directly on the silicon-based substrate has the physical characteristics of a micro device, the silicon-based display panel can display a high-quality image.

Figure 14:
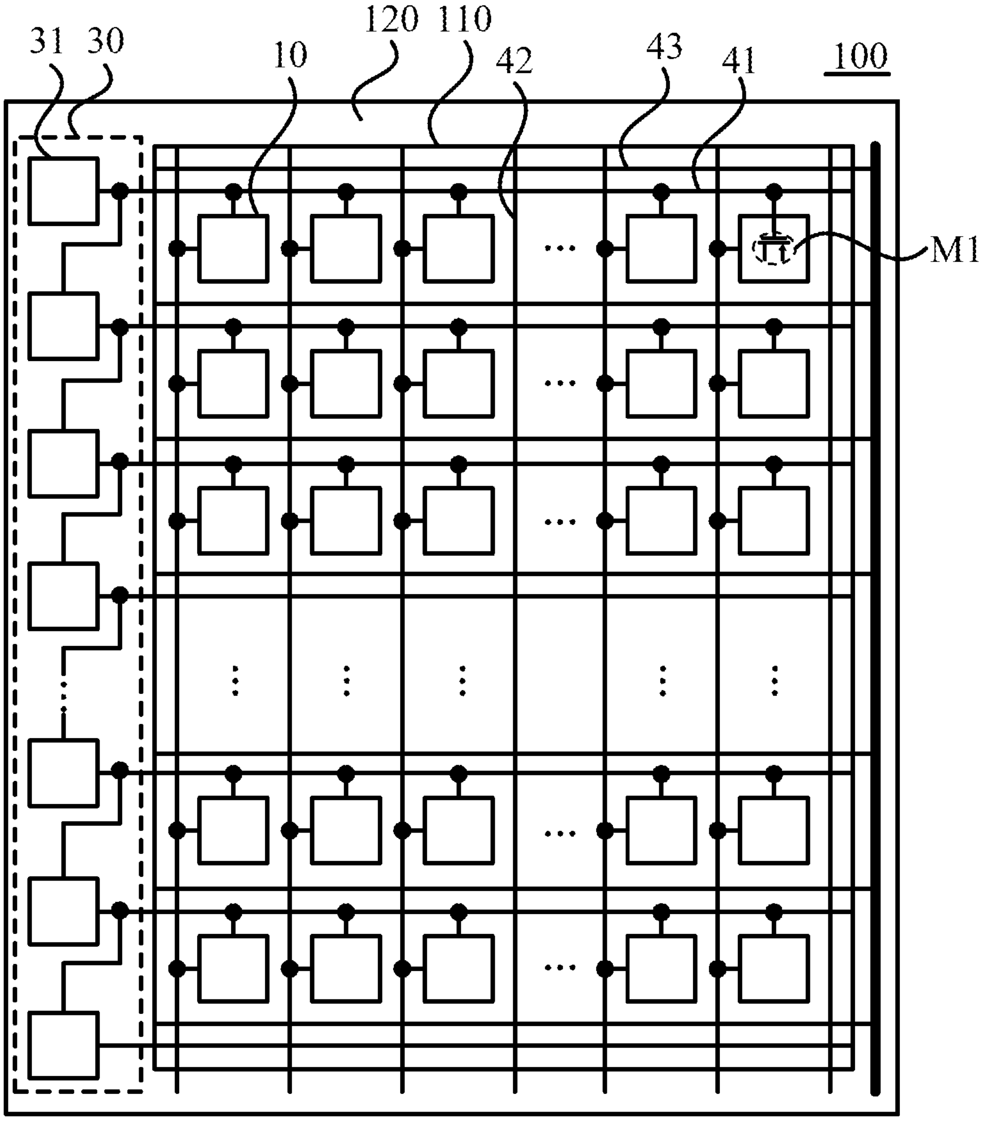
FIG. 14 is a structure diagram of a silicon-based display panel according to an embodiment of the present disclosure.

Optionally, FIG. 14 is a structure diagram of a silicon-based display panel according to an embodiment of the present disclosure. As shown in FIG. 14, a silicon-based display panel 100 includes a display region 110 and a non-display region 120 surrounding the display region 110, where the light-emitting elements are disposed in the display region 110; the silicon-based display panel 100 further includes a light emission scan driving circuit 30 disposed in the non-display region 120; the light emission scan driving circuit 30 includes a plurality of light emission scan drive units 31 cascaded; each of the plurality of light emission scan drive units 31 is electrically connected to gates of light emission control transistors M1 in pixel driving circuits in one respective row. In this case, one pixel driving circuit and one light-emitting element may constitute one pixel 10. Each of the plurality of light emission scan drive units 31 is configured to output, in sequence, a light emission control signal to the light emission control transistors M1 in the pixel driving circuits in the one respective row. The light emission control signal includes a first light emission enable level, a second light emission enable level, or a light emission non-enable level. In this manner, at a reset stage, each light emission scan drive unit 31 may output, in sequence, the first light emission enable level of the light emission control signal to the gates of the light emission control transistors M1 in one respective row of pixels 10 so that the light emission control transistors M1 in each row of pixels 10 are in a first on state in sequence to reset drive transistors and light-emitting elements in the each row of pixels 10 in sequence. At a threshold compensation stage and a data write stage, each light emission scan drive unit 31 outputs the light emission non-enable level to the gates of the light emission control transistors M1 in one respective row of pixels 10 so that the light emission control transistors M1 in each row of pixels 10 are in an off state. At a light emission stage, each light emission scan drive unit 31 may output, in sequence, the second light emission enable level of the light emission control signal to the gates of the light emission control transistors M1 in one respective row of pixels 10 so that the light emission control transistors M1 in each row of pixels 10 are in a second on state in sequence, and drive currents provided by the drive transistors in the each row of pixels 10 are provided to the light-emitting elements in the each row of pixels 10 in sequence to drive the light-emitting elements in the each row of pixels 10 to emit light in sequence, thereby causing the silicon-based display panel 100 to display a corresponding image.

Additionally, the display region 110 of the silicon-based display panel 100 may further include light emission control signal lines 41, a plurality of reset signal lines 43, and a plurality of data signal lines 42; where gates of light emission control transistors M1 in at least part of pixel driving circuits in the same row are electrically connected to the same light emission control signal line 41 which is configured to transmit the light emission control signal; reset circuits in at least part of pixel driving circuits in the same row or the same column are electrically connected to the same reset signal line 43 which is configured to transmit a reset signal; data write circuits in at least part of pixel driving circuits in the same column are electrically connected to the same data signal line 42 which is configured to transmit a data signal; and each light emission scan drive unit 31 is electrically connected to gates of light emission control transistors M1 in pixel driving circuits in one respective row through a respective one of the plurality of light emission control signal lines 41. In this manner, the light emission control signal provided by the light emission scan drive unit 31 may be transmitted to light emission control transistors M1 in corresponding pixels 10 through a corresponding light emission control signal line 41, the reset signal is provided to reset circuits in each row of pixels 10 through a respective reset signal line 43, and the data signal is transmitted to data write circuits in each column of pixels 10 through a respective data signal line 42.

Figure 15:
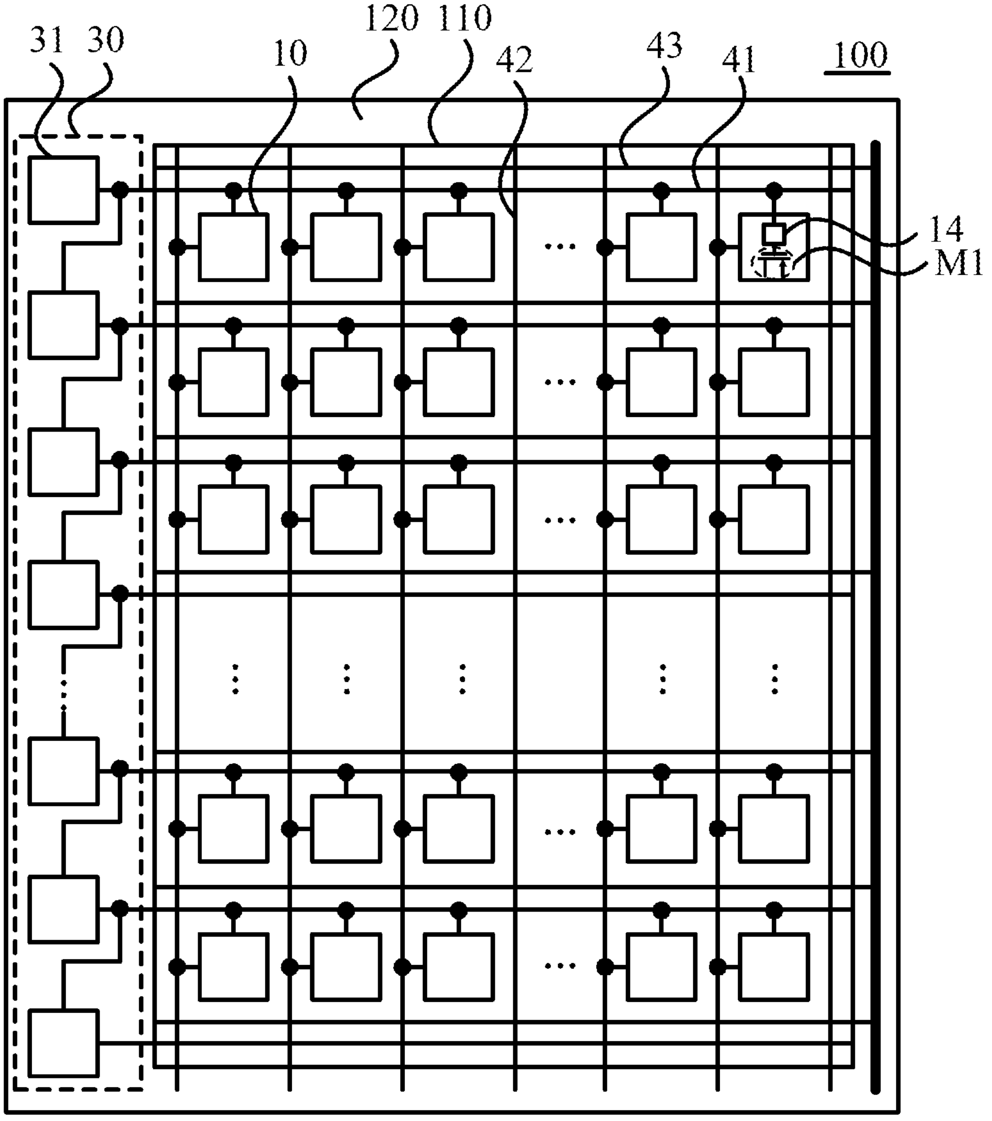
FIG. 15 is a structure diagram of another silicon-based display panel according to an embodiment of the present disclosure.

Optionally, FIG. 15 is a structure diagram of another silicon-based display panel according to an embodiment of the present disclosure. As shown in FIG. 15, when the pixel driving circuit includes a signal conversion circuit 14, the signal conversion circuit 14 may be electrically connected between the light emission control signal line 41 and the light emission control transistor M1. The signal conversion circuit 14 is configured to convert, at an initial stage, the light emission control signal transmitted through the light emission control signal line to the first light emission enable level to control the light emission control transistor M1 to be in the first on state, convert, at the threshold compensation stage and the data write stage, the light emission control signal transmitted through the light emission control signal line to the light emission non-enable level to control the light emission control transistor M1 to be in the off state, and convert, at the light emission stage, the light emission control signal transmitted through the light emission control signal line to the second light emission enable level to control the light emission control transistor M1 to be in the second on state. In this manner, the signal conversion circuit 14 is provided in each pixel driving circuit to convert the light emission control signal outputted from the light emission scan drive unit 31 to a corresponding level signal so that the on state of the light emission control transistor is controlled, which can ensure that the reset stage, the threshold compensation stage, the data write stage, and the light emission stage of the pixel driving circuit are steadily performed while reducing power consumption.

Figure 16:
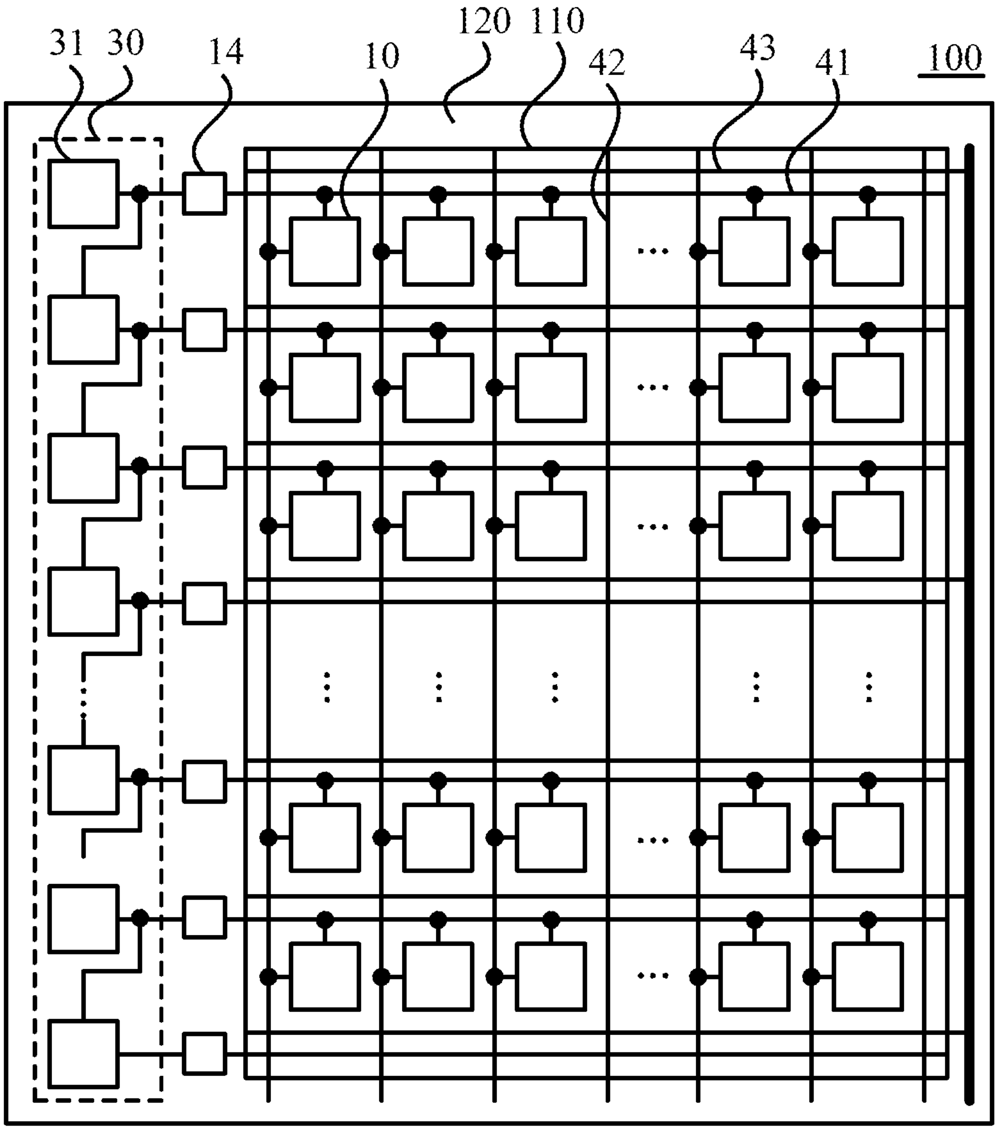
FIG. 16 is a structure diagram of another silicon-based display panel according to an embodiment of the present disclosure.

Optionally, FIG. 16 is a structure diagram of another silicon-based display panel according to an embodiment of the present disclosure. As shown in FIG. 16, when the pixel driving circuit includes the signal conversion circuit 14, pixel driving circuits electrically connected to the same light emission control signal line 41 share the signal conversion circuit 14, that is, the signal conversion circuit 14 is electrically connected between the light emission scan drive unit 31 and the light emission control signal line 41. Similarly, the signal conversion circuit 14 is configured to convert, at the initial stage, the light emission control signal outputted by the light emission scan drive unit to the first light emission enable level to control the light emission control transistors to be in the first on state, convert, at the threshold compensation stage and the data write stage, the light emission control signal outputted by the light emission scan drive unit to the light emission non-enable level to control the light emission control transistors to be in the off state, and convert, at the light emission stage, the light emission control signal outputted by the light emission scan drive unit to the second light emission enable level to control the light emission control transistors to be in the second on state. In this manner, the pixel driving circuits electrically connected to the same light emission control signal line share the signal conversion circuit, which can reduce the number of signal conversion circuits in the silicon-based display panel, simplify the structure of the pixel driving circuit in the silicon-based display panel, and improve the aperture ratio of the silicon-based display panel.

Based on the same inventive concept, the embodiments of the present disclosure further provide a display device. The display device includes the silicon-based display panel provided by the embodiments of the present disclosure. Therefore, the display device provided by the embodiments of the present disclosure includes the technical features of the silicon-based display panel provided by the embodiments of the present disclosure and can achieve the beneficial effects of the silicon-based display panel provided by the embodiments of the present disclosure. For the same, reference may be made to the description of the silicon-based display panel provided by the embodiments of the present disclosure. The details are not repeated here. The display device provided by the embodiments of the present disclosure may include, but is not limited to, a wearable device having a display function, such as a wristwatch, a bracelet, and VR glasses.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations, combinations, and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A pixel driving circuit for driving a light-emitting element to emit light, comprising: a drive transistor, a light emission control transistor, a first capacitor, a second capacitor, a reset circuit, a data write circuit, and a threshold compensation circuit; wherein a gate of the drive transistor, a first terminal of the first capacitor, a second terminal of the second capacitor, and the threshold compensation circuit are electrically connected to a first node; a first terminal of the second capacitor is configured to receive a fixed voltage signal; a first electrode of the light emission control transistor, a second electrode of the drive transistor, and the threshold compensation circuit are electrically connected to a second node; a second electrode of the light emission control transistor, the reset circuit, and an anode of the light-emitting element are electrically connected to a third node;

wherein the reset circuit comprises a reset transistor, and the threshold compensation circuit comprises a threshold compensation transistor, and the data write circuit comprises a data write transistor;

a first electrode of the reset transistor is configured for receiving a reset signal, a second electrode of the reset transistor is electrically connected to the third node, and a gate of the reset transistor is configured for receiving a second scan signal and is configured to be turned on or off under control of the second scan signal; and a gate of the threshold compensation transistor is configured for receiving a first scan signal, a first electrode of the threshold compensation transistor is electrically connected to the first node, and a second electrode of the threshold compensation transistor is electrically connected to the second node and is configured to be turned on or off under control of the first scan signal;

a gate of the data write transistor is configured for receiving a third scan signal and configured to be turned on or off under control of the third scan signal, a first electrode of the data write transistor is electrically connected to a second terminal of the first capacitor through a fourth node, and a second electrode of the data write transistor is configured for receiving a data signal;

at an initial stage, the reset circuit is configured to provide the reset signal to the third node to reset the anode of the light-emitting element; the light emission control transistor is configured to be in a first on state under control of a first light emission enable level to transmit the reset signal to the second node to reset the second electrode of the drive transistor; when the first scan signal is applied to the threshold compensation transistor, the threshold compensation transistor is configured to transmit the reset signal to the first node to reset the first capacitor, the second capacitor, and the gate of the drive transistor; and the data write transistor is configured to transmit a non-enable level of the data signal to the second terminal of the first capacitor;

at a threshold compensation stage, the threshold compensation transistor is configured to provide a threshold voltage of the drive transistor to the first node for compensation such that a potential of the first node is equal to VN1; and the data write transistor is configured to continue writing the non-enable level of the data signal to the second terminal of the first capacitor, and the reset transistor is further configured to continuously provide the reset signal to the third node;

at a data write stage, the data write transistor is configured to write an enable level of the data signal to the second terminal of the first capacitor such that the potential of the first node changes from VN1 to VN1', wherein VN1'=VN1−(Vdata−Vofs)×(c1/(c1+c2)), Vdata denotes the enable level of the data signal, Vofs denotes the non-enable level of the data signal, c1 denotes a capacitance value of the first capacitor, and c2 denotes a capacitance value of the second capacitor; and at a light emission stage, the light emission control transistor is configured to be in a second on state under control of a second light emission enable level such that a drive current generated by the drive transistor according to the potential VN1' of the first node is transmitted to the light-emitting element to drive the light-emitting element to emit light;

wherein a smaller current flows through the light emission control transistor in the first on state than the light emission control transistor in the second on state, wherein the pixel driving circuit further comprises: a signal conversion circuit electrically connected to a gate of the light emission control transistor; wherein the signal conversion circuit is configured to provide:

at the initial stage, the first light emission enable level to the gate of the light emission control transistor to control the light emission control transistor to be in the first on state, at the threshold compensation stage and the data write stage, a light emission non-enable level to the gate of the light emission control transistor to control the light emission control transistor to be in an off state, and at the light emission stage, the second light emission enable level to the gate of the light emission control transistor to control the light emission control transistor to be in the second on state.

2. The pixel driving circuit according to claim 1, wherein the signal conversion circuit comprises a first enable level conversion circuit, a second enable level conversion circuit, and a third enable level conversion circuit; wherein the first enable level conversion circuit is electrically connected to a first level signal terminal, a first logic control signal terminal, and the gate of the light emission control transistor and configured to provide the first light emission enable level from the first level signal terminal to the gate of the light emission control transistor under control of a first logic control signal outputted from the first logic control signal terminal;

the second enable level conversion circuit is electrically connected to a first light emission control signal terminal, a second level signal terminal, and the gate of the light emission control transistor and configured to provide the second light emission enable level from the second level signal terminal to the gate of the light emission control transistor under control of a first light emission control signal outputted from the first light emission control signal terminal; and the third enable level conversion circuit is electrically connected to a second logic control signal terminal, a second light emission control signal terminal, a third level signal terminal, and the gate of the light emission control transistor and configured to provide the light emission non-enable level from the third level signal terminal to the gate of the light emission control transistor under control of a second light emission control signal outputted from the second light emission control signal terminal and a second logic control signal outputted from the second logic control signal terminal.

3. The pixel driving circuit according to claim 2, wherein the first enable level conversion circuit comprises a first transistor, a gate of the first transistor is electrically connected to the first logic control signal terminal, a first electrode of the first transistor is electrically connected to the first level signal terminal, and a second electrode of the first transistor is electrically connected to the gate of the light emission control transistor;

wherein the second enable level conversion circuit comprises a second transistor, a gate of the second transistor is electrically connected to the first light emission control signal terminal, a first electrode of the second transistor is electrically connected to the second level signal terminal, and a second electrode of the second transistor is electrically connected to the gate of the light emission control transistor; and wherein the third enable level conversion circuit comprises a NAND gate and a third transistor, wherein a first input terminal of the NAND gate is electrically connected to the second logic control signal terminal, a second input terminal of the NAND gate is electrically connected to the second light emission control signal terminal, and an output terminal of the NAND gate is electrically connected to a gate of the third transistor; and wherein a first electrode of the third transistor is electrically connected to the third level signal terminal and a second electrode of the third transistor is electrically connected to the gate of the light emission control transistor.

4. The pixel driving circuit according to claim 3, wherein the first transistor and the third transistor are of a same channel type; and the first logic control signal terminal serves as the second logic control signal terminal.

5. The pixel driving circuit according to claim 3, wherein the second transistor and the third transistor are of different channel types; and the first light emission control signal is reverse to the second light emission control signal.

6. The pixel driving circuit according to claim 5, wherein the signal conversion circuit further comprises a first phase inverter; wherein the first phase inverter is electrically connected between the first light emission control signal terminal and the second light emission control signal terminal.

7. The pixel driving circuit according to claim 1, wherein the reset transistor and the threshold compensation transistor are of a same channel type; and the first scan signal serves as the second scan signal.

8. A silicon-based display panel, comprising a plurality of light-emitting elements and a plurality of pixel driving circuits according to claim 1, wherein the plurality of pixel driving circuits are arranged in an array and configured to drive the plurality of light-emitting elements to emit light.

9. The silicon-based display panel according to claim 8, comprising a display region and a non-display region surrounding the display region, wherein the plurality of light-emitting elements are disposed in the display region;

wherein the silicon-based display panel further comprises a light emission scan driving circuit disposed in the non-display region;

wherein the light emission scan driving circuit comprises a plurality of light emission scan drive units cascaded, each of the plurality of light emission scan drive units is electrically connected to gates of light emission control transistors in pixel driving circuits in one respective row, and each of the plurality of light emission scan drive units is configured to output, in sequence, a light emission control signal to the light emission control transistors in the pixel driving circuits in the one respective row;

wherein the light emission control signal comprises a first light emission enable level, a second light emission enable level, or a light emission non-enable level.

10. The silicon-based display panel according to claim 9, wherein the display region further comprises a plurality of light emission control signal lines, a plurality of reset signal lines, and a plurality of data signal lines; wherein gates of light emission control transistors in at least part of pixel driving circuits in a same row are electrically connected to a same light emission control signal line which is configured to transmit the light emission control signal;

reset circuits in at least part of pixel driving circuits in a same row or a same column are electrically connected to a same reset signal line which is configured to transmit a reset signal;

data write circuits in at least part of pixel driving circuits in a same column are electrically connected to a same data signal line which is configured to transmit a data signal; and each of the plurality of light emission scan drive units is electrically connected to gates of light emission control transistors in pixel driving circuits in one respective row through a respective one of the plurality of light emission control signal lines.

11. The silicon-based display panel according to claim 10, wherein each of the plurality of pixel driving circuits further comprises a signal conversion circuit electrically connected between the light emission control signal line and a light emission control transistor in the each of the plurality of pixel driving circuits;

wherein the signal conversion circuit is configured to convert, at an initial stage, the light emission control signal transmitted through the light emission control signal line to the first light emission enable level to control the light emission control transistor to be in a first on state, convert, at a threshold compensation stage and a data write stage, the light emission control signal transmitted through the light emission control signal line to the light emission non-enable level to control the light emission control transistor to be in an off state, and convert, at a light emission stage, the light emission control signal transmitted through the light emission control signal line to the second light emission enable level to control the light emission control transistor to be in a second on state.

12. The silicon-based display panel according to claim 10, wherein each of the plurality of pixel driving circuits further comprises a signal conversion circuit, and pixel driving circuits electrically connected to the same light emission control signal line share the signal conversion circuit;

the signal conversion circuit is electrically connected between one of the plurality of light emission scan drive units and the light emission control signal line; and the signal conversion circuit is configured to: convert, at an initial stage, the light emission control signal outputted by the one of the plurality of light emission scan drive units to the first light emission enable level to control the light emission control transistors to be in a first on state, convert, at a threshold compensation stage and a data write stage, the light emission control signal outputted by the one of the plurality of light emission scan drive units to the light emission non-enable level to control the light emission control transistors to be in an off state, and convert, at a light emission stage, the light emission control signal outputted by the one of the plurality of light emission scan drive units to the second light emission enable level to control the light emission control transistors to be in a second on state.

13. A display device, comprising a silicon-based display panel, wherein the silicon-based display panel comprises a plurality of light-emitting elements and a plurality of pixel driving circuits, and the plurality of pixel driving circuits are arranged in an array and configured to drive the plurality of light-emitting elements to emit light;

wherein each of the plurality of pixel driving circuits comprises:

a drive transistor, a light emission control transistor, a first capacitor, a second capacitor, a reset circuit, a data write circuit, and a threshold compensation circuit; wherein a gate of the drive transistor, a first terminal of the first capacitor, a second terminal of the second capacitor, and the threshold compensation circuit are electrically connected to a first node; a first terminal of the second capacitor is configured to receive a fixed voltage signal; a first electrode of the light emission control transistor, a second electrode of the drive transistor, and the threshold compensation circuit are electrically connected to a second node; a second electrode of the light emission control transistor, the reset circuit, and an anode of the light-emitting element are electrically connected to a third node;

wherein the reset circuit comprises a reset transistor, and the threshold compensation circuit comprises a threshold compensation transistor, and the data write circuit comprises a data write transistor;

a first electrode of the reset transistor is configured for receiving a reset signal, a second electrode of the reset transistor is electrically connected to the third node, and a gate of the reset transistor is configured for receiving a second scan signal and is configured to be turned on or off under control of the second scan signal; and a gate of the threshold compensation transistor is configured for receiving a first scan signal, a first electrode of the threshold compensation transistor is electrically connected to the first node, and a second electrode of the threshold compensation transistor is electrically connected to the second node and is configured to be turned on or off under control of the first scan signal;

a gate of the data write transistor is configured for receiving a third scan signal and configured to be turned on or off under control of the third scan signal, a first electrode of the data write transistor is electrically connected to a second terminal of the first capacitor through a fourth node, and a second electrode of the data write transistor is configured for receiving a data signal;

at an initial stage, the reset circuit is configured to provide the reset signal to the third node to reset the anode of the light-emitting element; the light emission control transistor is configured to be in a first on state under control of a first light emission enable level to transmit the reset signal to the second node to reset the second electrode of the drive transistor; when the first scan signal is applied to the threshold compensation circuit, the threshold compensation transistor is configured to transmit the reset signal to the first node to reset the first capacitor, the second capacitor, and the gate of the drive transistor; and the data write transistor is configured to transmit a non-enable level of the data signal to the second terminal of the first capacitor;

at a threshold compensation stage, the threshold compensation transistor is configured to provide a threshold voltage of the drive transistor to the first node for compensation such that a potential of the first node is equal to VN1; and the data write transistor is configured to continue writing the non-enable level of the data signal to the second terminal of the first capacitor, and the reset transistor is further configured to continuously provide the reset signal to the third node;

at a data write stage, the data write transistor is configured to write an enable level of the data signal to the second terminal of the first capacitor such that the potential of the first node changes from VN1 to VN1', wherein $VN1' = VN1 - (Vdata - Vofs) \times (c1/(c1+c2))$, Vdata denotes the enable level of the data signal, Vofs denotes the non-enable level of the data signal, c1 denotes a capacitance value of the first capacitor, and c2 denotes a capacitance value of the second capacitor; and at a light emission stage, the light emission control transistor is configured to be in a second on state under control of a second light emission enable level such that a drive current generated by the drive transistor according to the potential VN1' of the first node is transmitted to the light-emitting element to drive the light-emitting element to emit light;

wherein a smaller current flows through the light emission control transistor in the first on state than the light emission control transistor in the second on state;

wherein each of the plurality of pixel driving circuits further comprises: a signal conversion circuit electrically connected to a gate of the light emission control transistor; wherein the signal conversion circuit is configured to provide:

at the initial stage, the first light emission enable level to the gate of the light emission control transistor to control the light emission control transistor to be in the first on state, at the threshold compensation stage and the data write stage, a light emission non-enable level to the gate of the light emission control transistor to control the light emission control transistor to be in an off state, and at the light emission stage, the second light emission enable level to the gate of the light emission control transistor to control the light emission control transistor to be in the second on state.

* * * * *